United States Patent
Jin et al.

(10) Patent No.: US 12,494,867 B2
(45) Date of Patent: Dec. 9, 2025

(54) METHOD AND APPARATUS FOR PERFORMING PDCCH REPETITIVE TRANSMISSION THROUGH PLURALITY OF TRANSMISSION AND RECEPTION POINTS (TRPS) IN NEXT-GENERATION MOBILE COMMUNICATION SYSTEM

(71) Applicant: SAMSUNG ELECTRONICS CO., LTD., Suwon-si (KR)

(72) Inventors: Seungri Jin, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 476 days.

(21) Appl. No.: 18/050,931

(22) Filed: Oct. 28, 2022

(65) Prior Publication Data
US 2023/0133263 A1    May 4, 2023

(30) Foreign Application Priority Data

Oct. 29, 2021    (KR) .................. 10-2021-0146522

(51) Int. Cl.
| | |
|---|---|
| H04L 5/00 | (2006.01) |
| H04L 1/08 | (2006.01) |
| H04L 5/14 | (2006.01) |
| H04W 72/23 | (2023.01) |

(52) U.S. Cl.
CPC .............. *H04L 1/08* (2013.01); *H04L 5/0053* (2013.01); *H04W 72/23* (2023.01)

(58) Field of Classification Search
CPC ....... H04L 1/08; H04L 5/0053; H04L 5/0035; H04W 72/23
See application file for complete search history.

(56) References Cited

U.S. PATENT DOCUMENTS

| | | |
|---|---|---|
| 2020/0351847 A1 | 11/2020 | Kim et al. |
| 2020/0389874 A1 | 12/2020 | Lin et al. |
| 2021/0105780 A1 | 4/2021 | Jin et al. |
| 2021/0195601 A1 | 6/2021 | Khoshnevisan et al. |
| 2022/0131645 A1* | 4/2022 | Miao ..................... H04L 1/08 |

(Continued)

FOREIGN PATENT DOCUMENTS

| | | | |
|---|---|---|---|
| EP | 3878232 A1 | 9/2021 | |
| WO | WO-2022104797 A1 * | 5/2022 | ........... H04L 5/0053 |

OTHER PUBLICATIONS

3GPP TSG-RAN2 Meeting#99, R2-1709630 Title:CSG Type Functionality fro NR (Year: 2017).*

(Continued)

*Primary Examiner* — Faruk Hamza
*Assistant Examiner* — Abusayeed M Haque

(57) ABSTRACT

Disclosed are a communication scheme and a system thereof for converging IoT technology and a 5G communication system for supporting a higher data transmission rate beyond that of a 4G system. The disclosure can be applied to intelligent services (for example, services related to smart homes, smart buildings, smart cities, smart cars, connected cars, health care, digital education, retail business, security, and safety) based on the 5G communication technology and the IoT-related technology. The disclosure discloses a method and an apparatus for supporting PDCCH repetitive transmission through a plurality of transmission and reception points.

20 Claims, 17 Drawing Sheets

(56) References Cited

U.S. PATENT DOCUMENTS

| | | | | |
|---|---|---|---|---|
| 2022/0140881 | A1* | 5/2022 | Zhang | H04L 5/0051 |
| | | | | 370/329 |
| 2022/0149918 | A1* | 5/2022 | Miao | H04B 7/088 |
| 2022/0183049 | A1* | 6/2022 | Lee | H04W 72/569 |
| 2023/0076897 | A1* | 3/2023 | Svedman | H04L 5/0053 |
| 2023/0189380 | A1* | 6/2023 | Palat | H04W 76/11 |
| | | | | 370/329 |
| 2023/0397224 | A1* | 12/2023 | Lai | H04W 52/0216 |
| 2024/0251469 | A1* | 7/2024 | Zhou | H04W 76/20 |

OTHER PUBLICATIONS

3GPP TSG-RAN WG2 Meeting#113bis electric, R2-2103106 Title: Discussion of Deactivation of SCG (Year: 2021).*

CATT, "On multi-TRP/panel for PDCCH, PUCCH and PUSCH", R1-2109185, 3GPP TSG RAN WG1, Meeting #106b-e, Oct. 11-19, 2021, 12 pages.

Qualcomm Incorporated, "Enhancements on Multi-TRP for PDCCH, PUCCH and PUSCH", R1-2110166, 3GPP TSG RAN WG1 Meeting #106b-e, Oct. 11-Oct. 19, 2021, 23 pages.

Xiaomi, "Enhancements on Multi-TRP for PDCCH, PUSCH and PUCCH", R1-2109379, 3GPP TSG RAN WG1 Meeting #106b-e, Oct. 11-Oct. 19, 2021, 12 pages.

International Search Report and Written Opinion of the International Searching Authority dated Feb. 9, 2023, in connection with International Application No. PCT/KR2022/016738, 7 pages.

Supplementary European Search Report dated Feb. 20, 2025, in connection with European Patent Application No. 22887713.0, 11 pages.

* cited by examiner

Option 1-1 (1j-05):
Update the association of SS group ID

FIG. 10B

| R | Serving Cell ID | BWP ID | |
|---|---|---|---|
| C7 | C6 | C5 | C4 | C3 | C2 | C1 | C0 |

Option 2-1 (1j-10): Down scope the candidate SS group

| R | Serving Cell ID | BWP ID |
|---|---|---|
| R | R | R | R | SS group ID$_0$ |
| R | R | R | R | SS group ID$_1$ |
| ... |
| R | R | R | R | SS group ID$_{N-1}$ |

Option 2-2 (1j-15): SS group ID

| R | Serving Cell ID | BWP ID |
|---|---|---|
| R | R | R | R | SS group ID |
| R | R | SS group ID$_1$ |
| ... |
| L | R | SS group ID$_M$ |

Option 2-3 (1j-20): SS group ID and SS ID

| R | Serving Cell ID | BWP ID | | | |
|---|---|---|---|---|---|
| R | R | R | R | SS group ID | |
| S7 | S6 | S5 | S4 | S3 | S2 | S1 | S0 |

Option 2-4 (1j-25): Bitmap SS group ID and SS ID

FIG. 10C

| R | Serving Cell ID | BWP ID |
|---|---|---|
| C7 | C6 | C5 | C4 | C3 | C2 | C1 | C0 |

Option 3-1 (1j-30): Bitmap using SS group ID

| R | Serving Cell ID | | | BWP ID |
|---|---|---|---|---|
| A/D | R | R | R | SS group ID$_0$ |
| A/D | R | R | R | SS group ID$_1$ |

...

| A/D | R | R | R | SS group ID$_{N-1}$ |

Option 3-2 (1j-35): A/D field with SS group ID

| R | Serving Cell ID | | | BWP ID |
|---|---|---|---|---|
| A/D | R | R | R | SS group ID |
| R | R | SS group ID$_1$ | | |

...

| L | R | SS group ID$_M$ | | |

Option 3-3 (1j-40): A/D field with SS ID

| R | Serving Cell ID | | | BWP ID |
|---|---|---|---|---|
| R | R | R | R | SS group ID |
| S7 | S6 | S5 | S4 | S3 | S2 | S1 | S0 |

Option 3-4 (1j-45): Update

METHOD AND APPARATUS FOR PERFORMING PDCCH REPETITIVE TRANSMISSION THROUGH PLURALITY OF TRANSMISSION AND RECEPTION POINTS (TRPS) IN NEXT-GENERATION MOBILE COMMUNICATION SYSTEM

CROSS-REFERENCE TO RELATED APPLICATION

This application is based on and claims priority under 35 U.S.C. § 119 to Korean Patent Application No. 10-2021-0146522, filed on Oct. 29, 2021, in the Korean Intellectual Property Office, the disclosure of which is herein incorporated by reference in its entirety.

BACKGROUND

1. Field

The disclosure relates to a method and an apparatus for supporting physical downlink control channel (PDCCH) repetitive transmission through a plurality of transmission and reception points (TRPs).

2. Description of Related Art

To meet the demand for wireless data traffic having increased since deployment of 4G communication systems, efforts have been made to develop an improved fifth generation (5G) or pre-5G communication system. Therefore, the 5G or pre-5G communication system is also called a "beyond 4G network" communication system or a "post long term evolution (LTE)" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

In a next-generation mobile communication system using beams, a plurality of transmission reception points (TRPs) are introduced within a cell, and accordingly, when physical downlink control channel (PDCCH) repetitive transmission is supported for each TRP, a technology for associating two search spaces with each other is needed.

The above information is presented as background information only to assist with an understanding of the disclosure. No determination has been made, and no assertion is made, as to whether any of the above might be applicable as prior art with regard to the disclosure.

SUMMARY

The disclosure provides a method of supporting correlation between search space information of TRPs for a PDCCH repetitive transmission.

A method performed by a base station in a wireless communication system according to an embodiment of the disclosure in order to solve the problems includes: transmitting, to a terminal, first configuration information including a configuration for association between at least two search spaces and a group identity (ID) through a radio resource control (RRC) signaling, performing physical downlink control channel (PDCCH) repetitive transmission for the terminal in the at least two search spaces, based on the first configuration information; and transmitting, to the terminal, second configuration information indicating an updated configuration of the association or indicating whether the configuration is activated.

A method performed by a terminal in a wireless communication system according to an embodiment of the disclosure includes: receiving, from a base station, first configuration information including a configuration for association between at least two search spaces and a group identity (ID) through radio resource control (RRC) signaling; monitoring physical downlink control channel (PDCCH) repetitive transmission in the at least two search spaces, based on the first configuration information; and receiving, from the base station, second configuration information indicating an updated configuration of the association or indicating whether the configuration is activated.

A base station in a wireless communication system according to an embodiment of the disclosure includes: a transceiver; and a controller configured to control the transceiver to transmit, to a terminal, first configuration information including a configuration for association between at least two search spaces and a group identity (ID) through a radio resource control (RRC) signaling, perform physical downlink control channel (PDCCH) repetitive transmission for the terminal in the at least two search spaces, based on the first configuration information, and control the transceiver to transmit, to the terminal, second configuration information indicating an updated configuration of the association or indicating whether the configuration is activated.

A terminal in a wireless communication system according to an embodiment of the disclosure includes: a transceiver; and a controller configured to control the transceiver to receive, from a base station, first configuration information including a configuration for association between at least two search spaces and a group identity (ID) through radio resource control (RRC) signaling, monitor physical downlink control channel (PDCCH) repetitive transmission in the at least two search spaces, based on the first configuration information, and control the transceiver to receive, from the base station, second configuration information indicating an updated configuration of the association or indicating whether the configuration is activated.

According to an embodiment of the disclosure, there is an effect of, when PDCCH repetitive transmission for a plurality of TRPs is performed to the UE in a plurality of search spaces in a next-generation mobile communication system using beams, increasing reliability of PDCCH reception of the UE since it can be indicated that two PDCCH transmissions are repetitive transmissions.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10B illustrates an MAC CE format applied to example 2 and example 3 of according to various embodiments of the present disclosure;

FIG. 10C illustrates an MAC CE format applied to example 2 and example 3 of according to various embodiments of the present disclosure;

DETAILED DESCRIPTION

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

Figure 1:
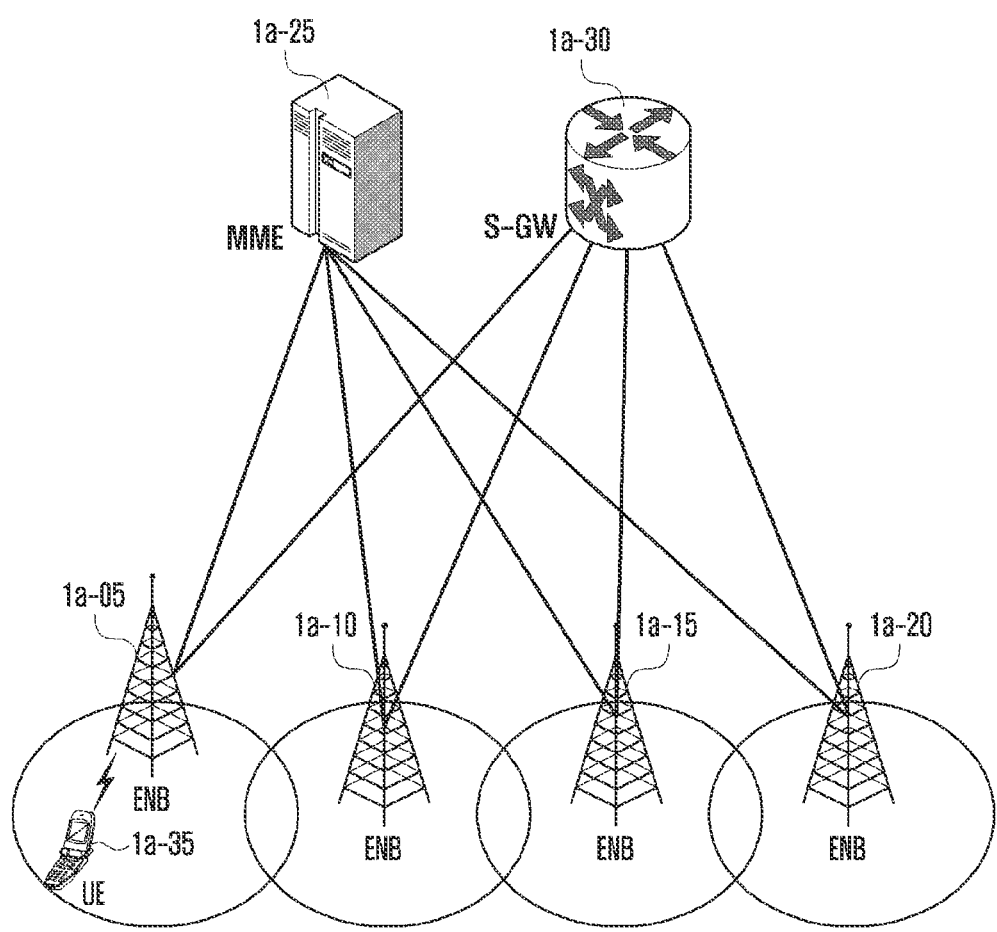
FIG. 1 illustrates a structure of an LTE system for reference according to various embodiments of the present disclosure.

FIG. 1 illustrates a structure of an LTE system for reference according to various embodiments of the present disclosure.

Referring to FIG. 1, a radio access network of the LTE system includes next-generation base stations (evolved node Bs) (hereinafter, referred to as eNBs, Node Bs, or base stations) 1*a*-05, 1*a*-10, 1*a*-15, and 1*a*-20, a mobility management entity (MME) 1*a*-25, and a serving gateway (S-GW) 1*a*-30. A user terminal (hereinafter, referred to as a user equipment (UE) or a terminal) 1*a*-35 accesses an external network through the eNBs 1*a*-05 to 1*a*-20 and the S-GW 1*a*-30.

In FIG. 1, the eNBs 1a-05 to 1a-20 correspond to the existing node Bs of the UMTS system. The eNB is connected to the UE 1a-35 through a radio channel, and performs a more complicated role than that of the conventional node B. In the LTE system, since all user traffic including a real-time service such as voice over IP (VoIP) via an Internet protocol are served through a shared channel, an apparatus for collecting and scheduling status information on buffer statuses of UEs, available transmission power status, and channel statuses is required, and the eNBs 1a-05 to 1a-20 may serve as this apparatus. One eNB generally controls plural cells. For, example, in order to implement a transmission rate of 100 Mbps, the LTE system uses an orthogonal frequency division multiplexing (OFDM) as a radio access technology in a bandwidth of 20 MHz. Further, an adaptive modulation and coding (AMC) scheme of determining a modulation scheme and a channel coding rate is applied depending on the channel status of the UE. The S-GW 1a-30 is a device for providing a data bearer, and generates or removes the data bearer under a control of the MME 1a-25. The MME is a device for performing not only a function of managing mobility of the UE but also various control functions and is connected to a plurality of eNBs.

Figure 2:
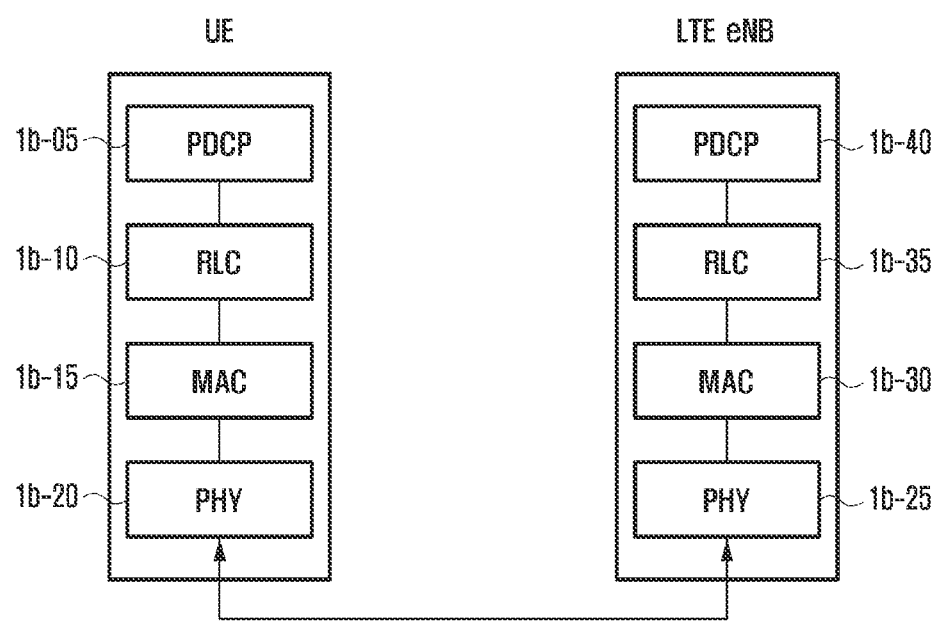
FIG. 2 illustrates a wireless protocol structure in the LTE system for reference according to various embodiments of the present disclosure.

FIG. 2 illustrates a wireless protocol structure in the LTE system for reference according to various embodiments of the present disclosure.

Referring to FIG. 2, the UE and the eNB include packet data convergence protocols (PDCPs) 1b-05 and 1b-40, radio link controls (RLCs) 1b-10 and 1b-35, and medium access controls (MACs) 1b-15 and 1b-30, respectively, in the wireless protocol of the LTE system. The PDCPs 1b-05 and 1b-40 perform an operation of compressing/decompressing an IP header. Main functions of the PDCP are described below:
Header compression and decompression function (ROHC only);
User data transmission function (Transfer of user data);
Sequential delivery function (In-sequence delivery of upper layer PDUs at PDCP re-establishment procedure for RLC AM);
Sequence re-arrangement function (For split bearers in DC (only support for RLC AM): PDCP PDU routing for transmission and PDCP PDU reordering for reception);
Duplicate detection function (Duplicate detection of lower layer SDUs at PDCP re-establishment procedure for RLC AM);
Retransmission function (Retransmission of PDCP SDUs at handover and, for split bearers in DC, of PDCP PDUs at PDCP data-recovery procedure, for RLC AM);
Ciphering and deciphering function (Ciphering and deciphering); and
Timer-based SDU removal function (Timer-based SDU discard in uplink).

Radio link control (RLC) 1b-10 and 1b-35 reconfigure the PDCP packet data unit (PDU) to be the proper size and perform an automatic repeat request (ARQ) operation. Main functions of the RLC are described below:
Data transmission function (Transfer of upper layer PDUs);
ARQ function (Error Correction through ARQ (only for AM data transfer));
Concatenation, segmentation, and reassembly function (Concatenation, segmentation, and reassembly of RLC SDUs (only for UM and AM data transfer));
Re-segmentation function (Re-segmentation of RLC data PDUs (only for AM data transfer));
Reordering function (Reordering of RLC data PDUs (only for UM and AM data transfer);
Duplication detection function (only for UM and AM data transfer));
Error detection function (Protocol error detection (only for AM data transfer));
RLC SDU deletion function (RLC SDU discard (only for UM and AM data transfer)); and
RLC re-establishment function (RLC re-establishment).

The MACs 1b-15 and 1b-30 are connected with various RLC layer devices included in one UE, and perform an operation for multiplexing RLC PDUs to the MAC PDU and demultiplexing the RLC PDUs from the MAC PDU. Main functions of the MAC are described below:
Mapping function (Mapping between logical channels and transport channels);
Multiplexing and demultiplexing function (Multiplexing/demultiplexing of MAC SDUs belonging to one or different logical channels into/from transport blocks (TB) delivered to/from the physical layer on transport channels);
Scheduling information report function (Scheduling information reporting);
HARQ function (Error correction through HARQ);
Logical channel priority control function (Priority handling between logical channels of one UE);
UE priority control function (Priority handling between UEs by means of dynamic scheduling);
MBMS service identification function (MBMS service identification);
Transport format selection function (Transport format selection); and
Padding function (Padding).

The PHY layers 1b-20 and 1b-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer. Further, the PHY layer uses hybrid ARQ (HARQ) to correct an additional error, and a receiving side transmits 1 bit indicating whether a packet transmitted by a transmitting side is received. The 1 bit is referred to as HARQ ACK/NACK information. Downlink HARQ ACK/NACK information for uplink transmission may be transmitted through a physical hybrid-ARQ indicator channel (PHICH), and uplink HARQ ACK/NACK information on downlink transmission may be transmitted through a physical uplink control channel (PUCCH) or a physical uplink shared channel (PUSCH).

Meanwhile, the PHY layer may include one or a plurality of frequencies/subcarriers, and a technology for simultaneously configuring and using a plurality of frequencies is referred to as carrier aggregation (CA). CA significantly increases the amount of transmission by the number of subcarriers by additionally using a primary carrier and one or a plurality of subcarriers, which is beyond the conventional technology, in which only one subcarrier is used for communication between the UE and the E-UTRAN NodeB (eNB). Meanwhile, in LTE, a cell within the eNB using a primary carrier is referred to as a primary cell (PCell) and a secondary carrier is referred to as a secondary cell (SCell).

Although not illustrated, there is a radio resource control (RRC) layer exists above the PDCP layer of each of the UE and the eNB, and the RRC layer may transmit and receive an access- and measurement-related configuration control message to control radio resources.

Figure 3:
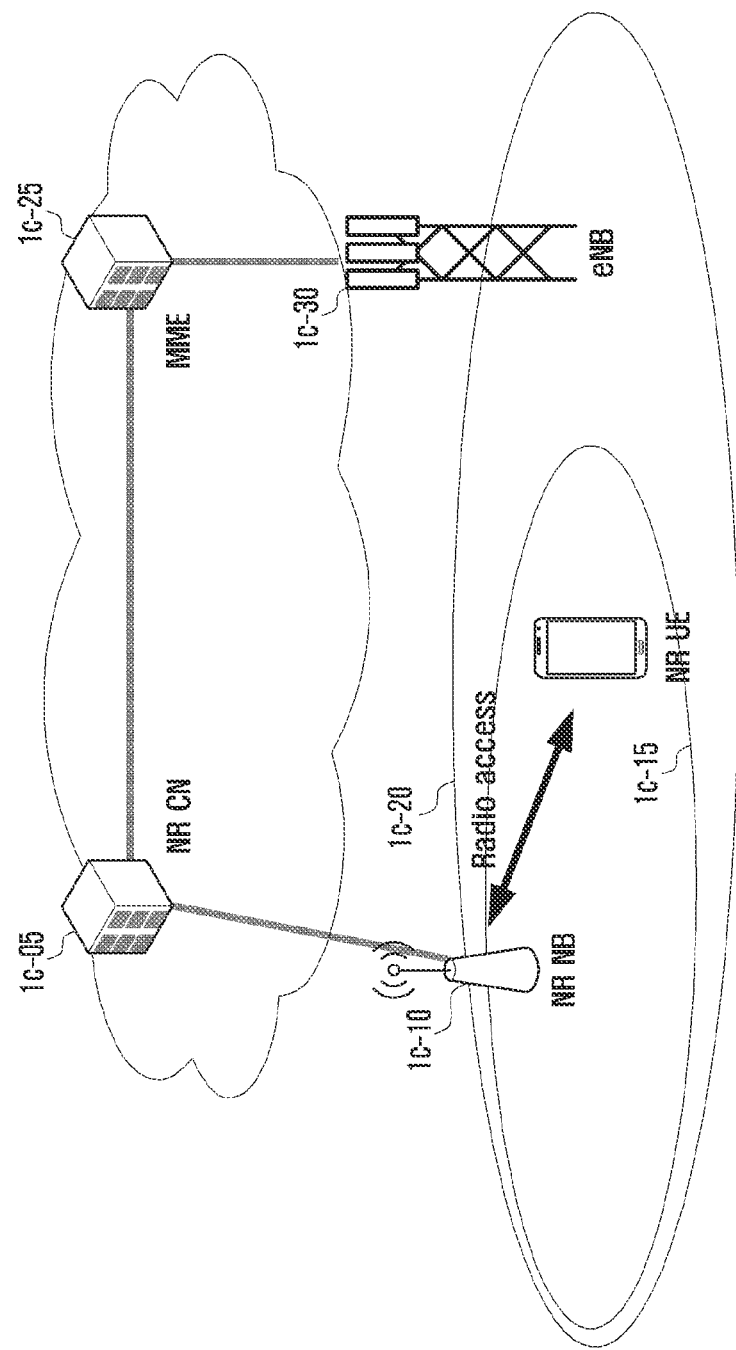
FIG. 3 illustrates a structure of a next-generation mobile communication system according to various embodiments of the present disclosure.

FIG. 3 illustrates a structure of the next-generation mobile communication system according to various embodiments of the present disclosure.

Referring to FIG. 3, the radio access network of the next-generation mobile communication system includes a next-generation base station 1c-10 (new radio node B) (hereinafter, referred to as an NR NB) and a new radio core network (NR CN) 1c-05 (or next generation core network (NG CN)). A user terminal 1c-15 (new radio user equipment) (hereinafter, referred to as a NR UE or a UE) accesses an external network through the NR NB 1c-10 and the NR CN 1c-05.

In FIG. 3, the NR NB 1c-10 corresponds to an evolved Node B (eNB) of the conventional LTE system. The NR NB may be connected to an NR UE 1c-15 through a radio channel and may provide better service than the conventional node B. Since all user traffic is served through a shared channel in the next-generation mobile communication system, a device for collecting and scheduling status information such as buffer statuses of UEs, available transmission power statuses, and channel statuses is required, and the NR NB 1c-10 serves as the device. One NR NB generally controls a plurality of cells. The NR NB may have a bandwidth wider than the conventional maximum bandwidth in order to implement super-high-speed data transmission compared to conventional LTE, may apply orthogonal frequency-division multiplexing (OFDM) through radio access technology, and may further apply beamforming technology.

Further, an adaptive modulation and coding (AMC) scheme of determining a modulation scheme and a channel coding rate is applied depending on the channel status of the UE. The NR CN 1c-05 performs a function of supporting mobility, configuring a bearer, and configuring a QoS. The NR CN is a device which performs not only a function of managing mobility of the UE but also various control functions and is connected to a plurality of eNBs. Further, the next-generation mobile communication system may interwork with the conventional LTE system, and the NR CN is connected to an MME 1c-25 through a network interface. The MME is connected to an eNB 1c-30, which is a conventional base station.

Figure 4:
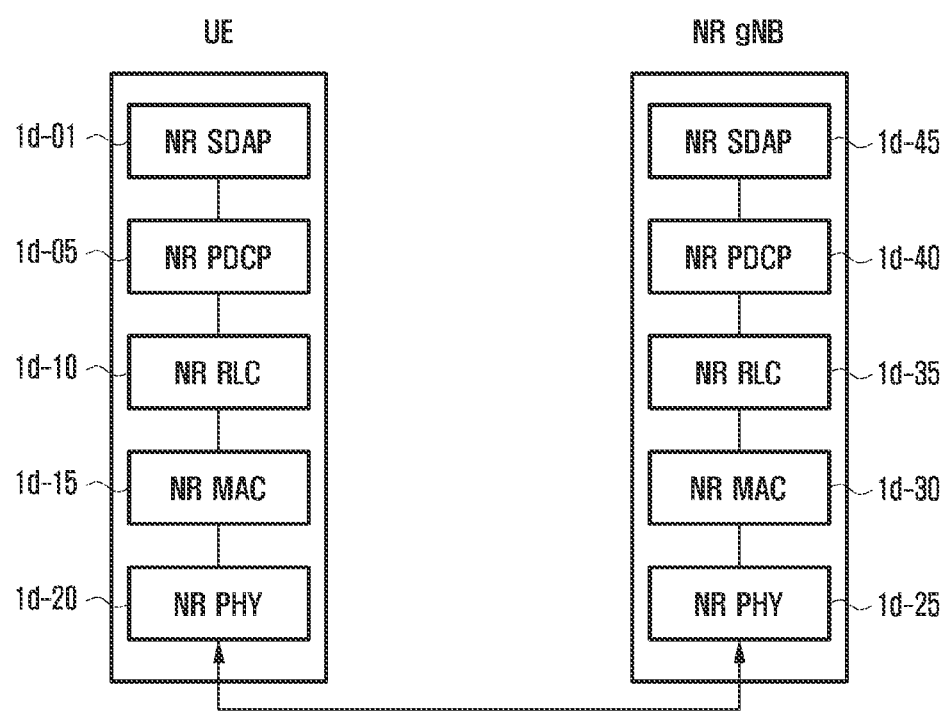
FIG. 4 illustrates a wireless protocol structure of the next-generation mobile communication system according to various embodiments of the present disclosure.

FIG. 4 illustrates a wireless protocol structure of the next-generation mobile communication system according to various embodiments of the present disclosure.

Referring to FIG. 4, the wireless protocol of the next-generation mobile communication system includes NR SDAPs 1d-01 and 1d-45, NR PDCPs 1d-05 and 1d-40, NR RLCs 1d-10 and 1d-35, and NR MACs 1d-15 and 1d-30 in the UE and the NR gNB.

The main functions of the NR SDAPs 1d-01 and 1d-45 may include some of the following functions:
  User data transmission function (transfer of user-plane data);
  Function of mapping QoS flow and a data bearer for uplink and downlink (mapping between a QoS flow and a DRB for both DL and UL);
  Function of marking a QoS flow ID for uplink and downlink (marking QoS flow ID in both DL and UL packets); and
  Function of mapping reflective QoS flow to a data bearer for uplink SDAP PDUs (reflective QoS flow to DRB mapping for the UL SDAP PDUs).

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCPs 1d-05 and 1d-40 may include some of the following functions:
  Header compression and decompression function (Header compression and decompression: ROHC only);
  User data transmission function (Transfer of user data);
  Sequential delivery function (In-sequence delivery of upper layer PDUs);
  Non-sequential delivery function (Out-of-sequence delivery of upper layer PDUs);
  Reordering function (PDCP PDU reordering for reception);
  Duplicate detection function (Duplicate detection of lower layer SDUs);
  Retransmission function (Retransmission of PDCP SDUs);
  Ciphering and deciphering function (Ciphering and deciphering); and
  Timer-based SDU removal function (Timer-based SDU discard in uplink).

The reordering function of the NR PDCP device is a function of sequentially reordering PDCP PDUs received by a lower layer on the basis of a PDCP sequence number (SN), and may include a function of sequentially transferring the reordered data to a higher layer, a function of directly transmitting the recorded data regardless of the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 1d-10 or 1d-35 may include some of the following functions:
  Data transmission function (Transfer of upper layer PDUs);
  Sequential delivery function (In-sequence delivery of upper layer PDUs);
  Non-sequential delivery function (Out-of-sequence delivery of upper layer PDUs);
  ARQ function (Error correction through ARQ);
  Concatenation, segmentation, and reassembly function (Concatenation, segmentation, and reassembly of RLC SDUs);
  Re-segmentation function (Re-segmentation of RLC data PDUs);
  Reordering function (Reordering of RLC data PDUs);
  Duplicate detection function (Duplicate detection);
  Error detection function (Protocol error detection);
  RLC SDU deletion function (RLC SDU discard); and
  RLC re-establishment function (RLC re-establishment).

The sequential delivery function (In-sequence delivery) of the NR RLC device is a function of sequentially transferring RLC SDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC sequence number (SN) or a PDCP SN, a function of recording RLC PDUs lost due to the reordering, a function of reporting statuses of the lost RLC PDUs to a transmitting side, a function of making a request for retransmitting the lost PDCP PDUs, a function of, if there is a lost RLC SDU, sequentially transferring only RLC SDUs preceding the lost RLC SDU to the higher layer, a function of, if a predetermined timer expires even though there is a lost RLC SDU, sequentially transferring all RLC SDUs received before the timer starts to the higher layer, or a function of, if a predetermined timer expires even though there is a lost RLC SDU, sequentially transferring all RLC SDUs received up to that point in time to the higher layer.

Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or may be received in the future, reconfigure the segments to be one RLC PDU, process the RLC PDU, and then transmit the same to the PDCP device. The NR RLC layer device may not include a concatenation function, and the function may be performed by the NR MAC layer, or may be replaced with a multiplexing function of the NR MAC layer.

The non-sequential function (out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1d-15 and 1d-30 may be connected to a plurality of NR RLC layer devices configured in one UE, and the main functions of the NR MACs may include some of the following functions:

Mapping function (Mapping between logical channels and transport channels);
Multiplexing and demultiplexing function (Multiplexing/demultiplexing of MAC SDUs);
Scheduling information report function (Scheduling information reporting);
HARQ function (Error correction through HARQ);
Logical channel priority control function (Priority handling between logical channels of one UE);
UE priority control function (Priority handling between UEs by means of dynamic scheduling);
MBMS service identification function (MBMS service identification);
Transport format selection function (Transport format selection); and
Padding function (Padding).

The NR PHY layers 1d-20 and 1d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 5:
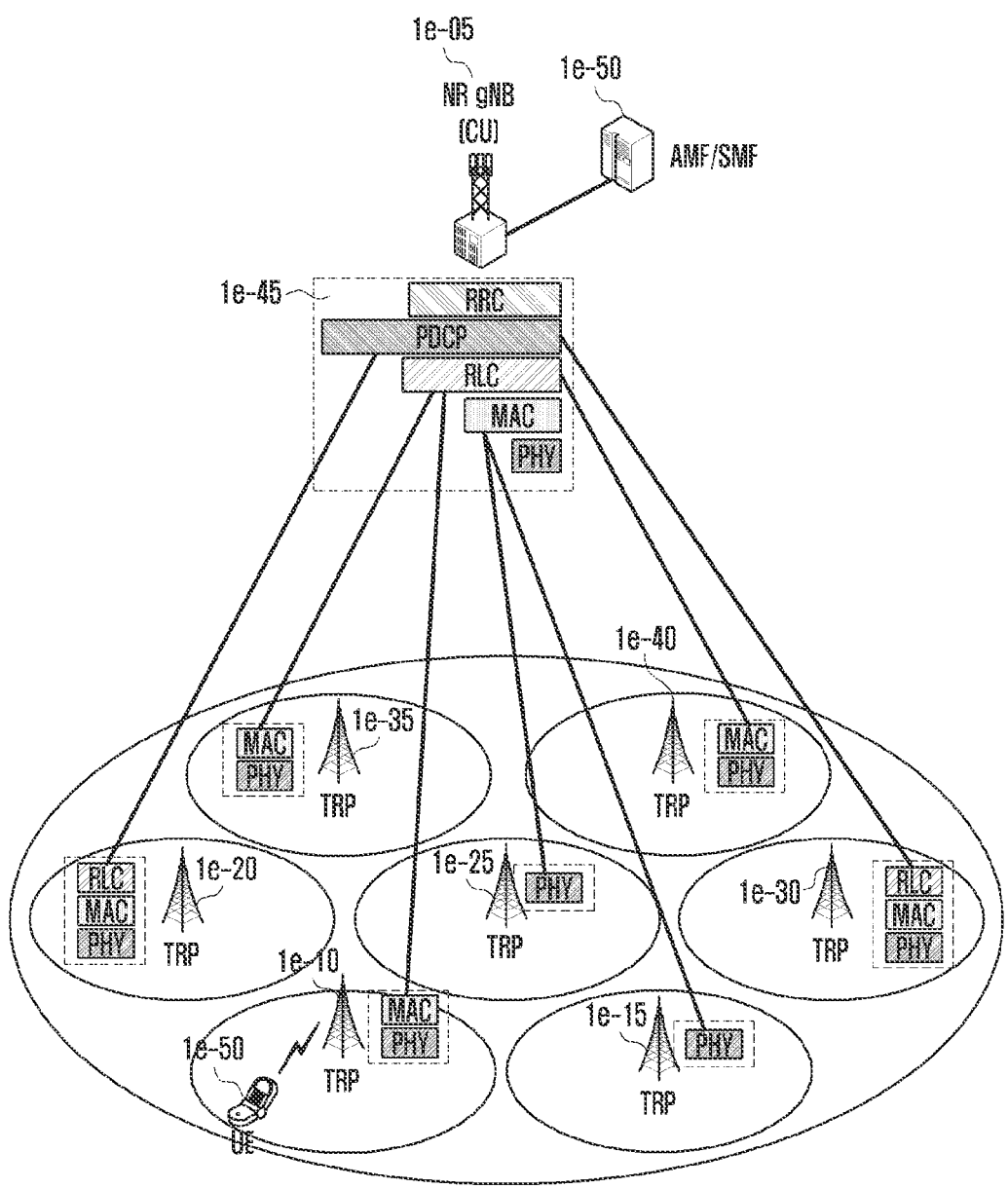
FIG. 5 illustrates a structure of another next-generation mobile communication system according to various embodiments of the present disclosure.

FIG. 5 illustrates a structure of another next-generation mobile communication system according to various embodiments of the present disclosure.

Referring to FIG. 5, a cell served by an NR gNB 1e-05 operating on the basis of the beam may include a plurality of transmission reception points (TRPs) 1e-10, 1e-15, 1e-20, 1e-25, 1e-30, 1e-35, and 1e-40. The TRPs 1e-10 to 1e-40 indicates blocks for separating some functions of transmitting and receiving physical signals by the conventional NR gNB (eNB) and includes a plurality of antennas. The NR gNB 1e-05 may be expressed as a central unit (CU) and the TRP may be expressed as a distributed unit (DU). Functions of the NR gNB 1e-05 and the TRP may be configured by separated layers such as PDCP/RLC/MAC/PHY layers 1e-45. That is, the TRPs may have only the PHY layer and perform a function of the corresponding layer as indicated by reference numerals 1e-15 and 1e-25, the TRPs may have only the PHY layer and the MAC layer and perform functions of the corresponding layers as indicated by reference numerals 1e-10, 1e-35, and 1e-40, and the TRPs may have only the PHY layer, the MAC layer, and the RLC layer and perform functions of the corresponding layers as indicated by reference numerals 1e-20 and 1e-30. Particularly, the TRPs 1e-10 to 1e-40 may use a beamforming technology of generating narrow beams in various directions through a plurality of transmission/reception antennas and transmitting/receiving data.

The UE 1e-50 accesses the NR gNB 1e-05 and the external network through the TRPs 1e-10 to 1e-40. In order to provide a service to users, the NR gNB 1e-05 collects and schedules status information such as buffer statuses, available transmission power statuses, and channel statuses of UEs and supports the connection between the UEs and a core network (CN), particularly, AMF/SMF 1e-50.

The TRP used throughout the specification has the structure 1e-15 or 1e-25 having only the PHY layer and capable of performing the function of the corresponding layer.

It is possible to increase reliability of a downlink control signal by performing PDCCH repetitive transmission through a plurality of TRPs in a scheme of improving the performance of physical downlink control channel (PDCCH) transmission and reception in the next-generation mobile communication system. Particularly, search space information of TRPs for PDCCH repetitive transmission may be linked/associated, and a method of supporting the same is considered in the disclosure. In the following description of the disclosure, the term "PDCCH repetitive transmission" is used, but the actual meaning thereof is an operation of performing PDCCH repetitive transmission through the search space for each of the plurality of TRPs.

Figure 6:
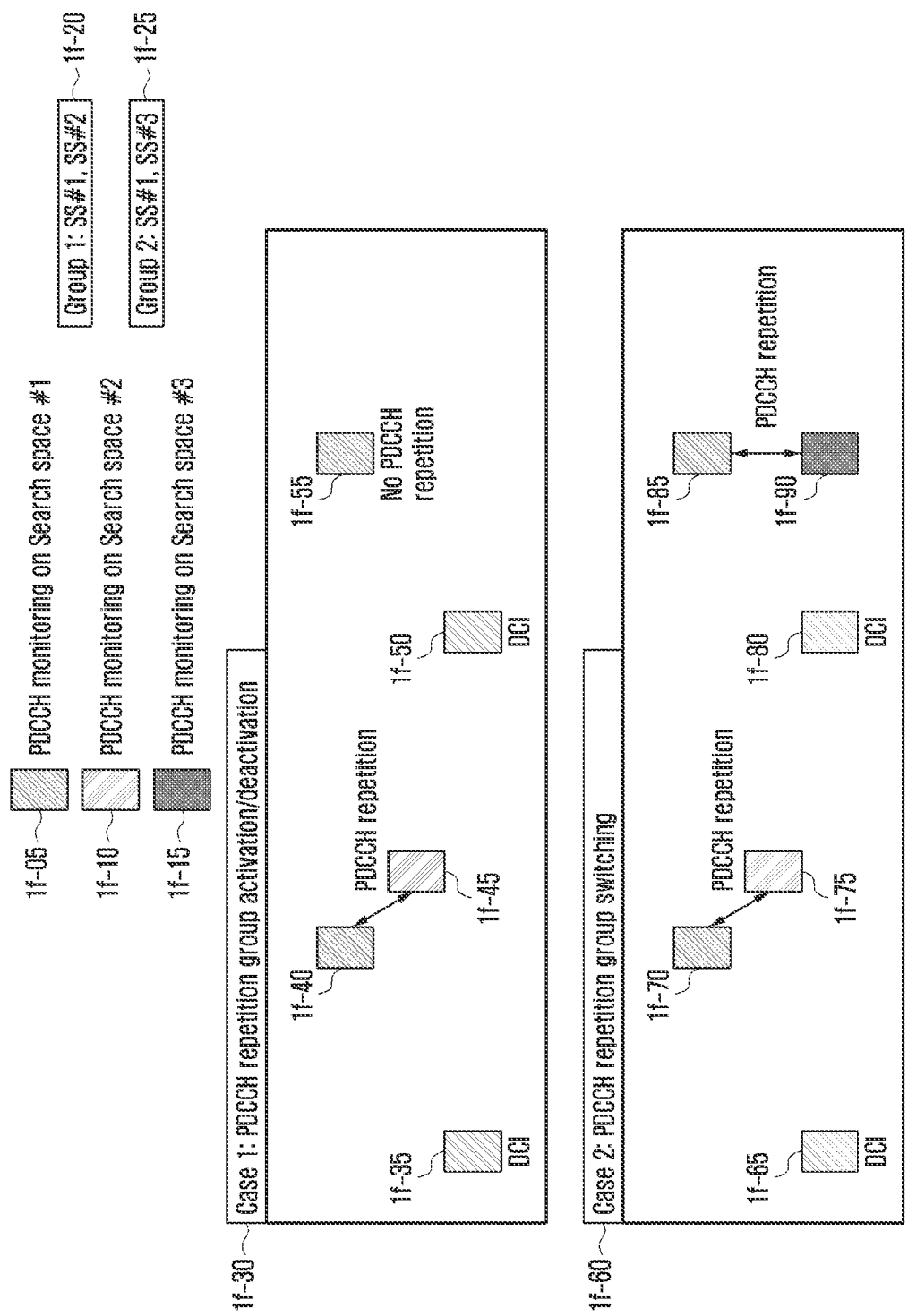
FIG. 6 illustrates a scenario in which PDCCH repetitive transmission using a plurality of TRPs is configured and performed in an NR system according to various embodiments of the present disclosure.

FIG. 6 illustrates a scenario in which PDCCH repetitive transmission using a plurality of TRPs is configured and performed in an NR system according to various embodiments of the present disclosure. Particularly, in FIG. 6, the operation of the conventional NR system is described, and may be referred to for an embodiment provided in the disclosure thereafter.

In order to receive the PDCCH, the UE may monitor resources through which the PDCCH is transmitted, and the PDCCH is received in specific resources within a CORESET (ControlResourceSet). Further, which resources within the CORESET may be monitored may be configured, which is a search space. The search space may be associated within one CORESET, and the UE receives the PDCCH in the configured search space within the CORESET through blind detection. Further, the search space may be largely divided into a common search space (CSS) and a UE-specific search space (USS), wherein the former is used to transmit common downlink control information (DCI) transmitted to all UEs within the cell and the later is used to transmit DCI for the UE.

In FIG. 6, PDCCH repetitive transmission is performed through a plurality of TRPs, the same downlink control signal is transmitted through the plurality of TRPs, and there may be a search space associated with the configuration of the PDCCH of each TRP. As shown in drawing, a plurality of search space configurations 1*f*-05, 1*f*-10, and 1*f*-15 may be provided in the PDCCH configuration, and, a search space group is configured through RRC configuration information and transmitted to the UE in order to additionally indicate the correlation between search spaces in which PDCCH repetitive transmission is performed. When each search space within a search space group is configured as a PDCCH repetition operation or is activated, respective search space entities may be associated with each other. That is, PDCCH repetitive transmission is performed through each TRP in the corresponding search space.

For example, search space 1 and search space 2 may be included in search space group 1 as indicated by reference numeral 1*f*-20, and search space 1 and search space 3 may be included in search space group 2 as indicated by reference numeral 1*f*-25. In this case, when search space group 1 is activated, the PDCCH may be monitored through search space 1 and search space 2 in TRP1 and TRP 2, and received downlink control signals (DCI) may be restored through soft-combining. Accordingly, it is possible to have higher reception/decoding performance compared to restoration through reception of only one signal. Similarly, when search space group 2 is activated, the PDCCH may be monitored through search space 1 and search space 3 in TRP1 and TRP 2, and received downlink control signals (DCI) may be restored through soft-combining.

To this end, search space groups which can be configured as a maximum of two existing groups may be reused (searchSpaceGroupIdList-r16) or the number of search space groups may be additionally increased (searchSpace-GroupIdListExt-r17) and used as the corresponding function. Further, there a slight difference in the operation according to whether PDCCH repetitive transmission through a plurality of current TRPs is applied only to a plurality of TRP operations based on a single-PDCCH or applied to both a plurality of TRP operations based on a single-PDCCH and a plurality of TRP operations based on multiple PDCCHs. For reference, a plurality of TRP operations based on a single-PDCCH corresponds to performing PDSCH data scheduling in a plurality of TRPs through a single-PDCCH control signal in one TRP and a plurality of TRP operations based on multiple PDCCH corresponds to performing PDSCH data scheduling to each TRP through a PDCCH control signal in each TRP, so as to support the plurality of PDSCH operations.

When PDCCH repetitive transmission is not supported in a plurality of TRPs based on multiple PDCCHs, an operations for limiting the same is needed. For example, when the search space is included in the search space group, a plurality of TRP configurations based on multiple PDCCHs may not be performed in a CORESET configuration associated with a specific search space. That is, a coresetPoolIndex-r16 field may not be set as 1 (TRUE) in the corresponding CORESET. Alternatively, even though the search space is included in the search space group, the UE ignores the coresetPoolIndex-r16 configuration as shown in TABLE 1.

TABLE 1

| The UE behavior |
|---|
| If SS is included in SS group for a PDCCH repetition, CORESET ID associated with this SS may not set coresetPoolIndex-r16 to 1 (i.e., mPDDCCH mTRP operation is not allowed); or |
| If SS is included in in SS group for a PDCCH repetition, UE ignores the coresetPoolIndex-r16 (i.e., assume coresetPoolIndex-r16 as 0) |

On the other hand, when PDCCH repetitive transmission is supported in a plurality of TRPs based on multiple PDDCHs, an indicator indicating a TRP for which the corresponding PDCCH control signal is may be needed. This is because two DCIs may be transmitted in TRP 1 and it is required to identify which signal is a repeatedly transmitted PDCCH control signal. Alternatively, the UE may receive all DCIs without distinction and restore the control signal while performing soft-combining in UE implementation as shown in TABLE 2.

TABLE 2

| The UE behavior |
|---|
| Require the indicator in DCI for mPDDCH based mTRP operation with a PDCCH repetition in order to distinguish the repeated PDCCH i.e., which one is associated with the original PDCCH; or UE do not distinguish at the point of receiving DCI, just decode both received PDCCH and apply soft combining |

In FIG. 6, reference numerals 1*f*-30 and 1*f*-60 indicate detailed examples in which PDCCH repetitive transmission is indicated through a specific group.

In one example of Case 1 1*f*-30, activation and deactivation operation of PDCCH repetitive transmission are provided.

The UE receives associated search space group information for PDCCH repetitive transmission through an RRC configuration, and receives activation of PDCCH repetitive transmission for the corresponding search space group by receiving DCI in operation 1*f*-35. Alternatively, the corresponding DCI may be omitted. This is because activation/deactivation information may be transmitted when the RRC is configured or the activation operation may be performed by a default value when the RRC is configured.

When activation of PDCCH repetitive transmission for search space group 1 is indicated, the UE monitors resources 1*f*-40 and 1*f*-45 according to the search space configuration. The PDCCH repetitive transmission is performed in the corresponding resources, and the UE may repeatedly receive the PDCCH control signal while monitoring the corresponding search space. In operation 1*f*-50, the UE may receive an indication of deactivation of the PDCCH repetitive transmission by receiving DCI and does not perform repeated PDCCH monitoring through the search space within the search space group in later PDCCH monitoring (only PDCCH monitoring through one TRP is performed).

In one example of Case 2 1*f*-60, a switching operation of PDCCH repetitive transmission is provided.

The UE receives associated search space group information for PDCCH repetitive transmission through an RRC configuration, and receives activation of PDCCH repetitive transmission for the corresponding search space group by receiving DCI in operation 1*f*-65. Alternatively, the corresponding DCI may be omitted. This is because activation/deactivation information may be transmitted when the RRC is configured or the activation operation may be performed by a default value when the RRC is configured.

When an activation of PDCCH repetitive transmission for search space group 1 is indicated, the UE monitors resources 1*f*-70 and 1*f*-75 according to the search space configuration. The PDCCH repetitive transmission is performed in the corresponding resources, and the UE may repeatedly receive the PDCCH control signal while monitoring the corresponding search space. In operation 1*f*-80, the UE may receive an indication of the PDCCH repetitive transmission performed through another search space by receiving DCI performs repeated PDCCH monitoring through search spaces 1*f*-85 and 1*f*-90 within search space group 2 in later PDCCH monitoring.

Figure 7:
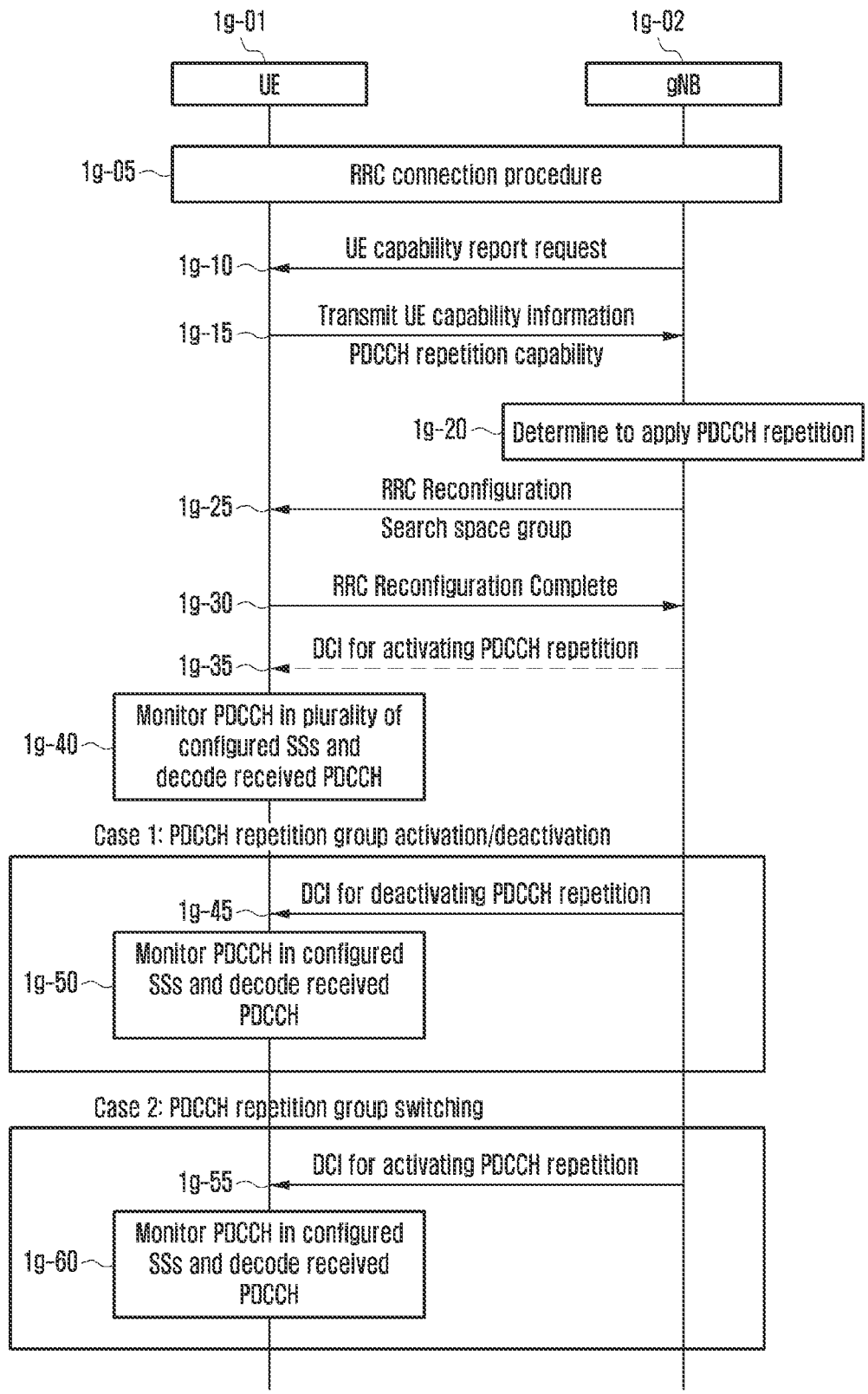
FIG. 7 illustrates an example 1 applied to the procedure of configuring and performing PDCCH repetitive transmission using a plurality of TRPs in the NR system according to various embodiments of the present disclosure.

FIG. 7 illustrates an example 1 applied to the procedure of configuring and performing PDCCH repetitive transmission using a plurality of TRPs in an NR system according to various embodiments of the present disclosure. FIG. 7 is additional function description of FIG. 6 and is described on the basis of FIG. 6.

A UE 1*g*-01 camps on a specific gNB 1*g*-02 and makes a connection configuration with a corresponding serving cell in operation 1*g*-05. The gNB makes a request for UE capability information to the UE in operation 1*g*-10, and the UE receives its own UE capability according to the request from the gNB and transfers the same through a UECapabilityInformation message in operation 1*g*-15. The message may include information indicating whether the UE supports capability of receiving the PDCCH repetitive transmission. This may be capability for all UEs or may be separated and reported for each specific band or band combination.

When the gNB identifies the capability of receiving the PDCCH repetitive transmission received from the UE and, when the UE supports the same, determines the PDCCH repetitive transmission in operation 1*g*-20. In operation 1*g*-25, the gNB transfers an RRC reconfiguration message including whether the PDCCH repetitive transmission is performed to the UE, and the corresponding message includes at least one of a search space group and a PDCCH repetitive transmission indicator. The search space group may include information on a group identifier and an identifier of a search space belonging to the corresponding group for each group.

The UE receives the RRC reconfiguration in operation 1*g*-30 and transfers an RRC reconfiguration completion message indicating that the RRC reconfiguration is received well to the gNB. Thereafter, in operation 1*g*-35, the gNB may transfer DCI indicating that the PDCCH repetitive transmission is activated to the UE, and the message may include information on which search space group is activated. For example, this may be indicated through at least one of a bit mapped to a search space group ID and an activation/deactivation indicator. Alternatively, activation/deactivation may be indicated when the search space group is configured in an RRC configuration operation, and an initial operation may be used or activation may be determined when the RRC configuration is performed. In this case, restriction of configuring only one search space group in the initial configuration may be needed.

The UE becoming aware of activation of the PDCCH repetitive transmission monitors search spaces within the configured search space group and blind-decodes a downlink control signal in operation 1*g*-40. That is, the UE may receive the same downlink control signal transmitted in each search space through two TRPs, and perform soft-combining to decode the downlink control signal.

The following operations are separately described in two cases.

In one example, the gNB switches PDCCH repetitive transmission activated in the UE to a deactivated state. In this case, in operation 1*g*-45, the gNB may insert an indicator indicating the stop of PDCCH repetitive transmission for the corresponding search space group into DCI and transfer the DCI to the UE, and at least one of a search space group identifier and an activation and deactivation indicator may be included in the DCI. The UE receiving deactivation of the PDCCH repetitive transmission performs PDCCH monitoring in one search space and receives and decodes the downlink control signal in operation 1*g*-50. When deactivation is indicated, the UE may naturally return to the operation original TRP 1. Alternatively, when deactivation is indicated through DCI, deactivated or activated specific TRP may also be indicated.

In another example, the gNB switches PDCCH repetitive transmission activated in the UE to another search space group. In this case, in operation 1*g*-55, the gNB may insert an indicator of a search space group to which the PDCCH repetitive transmission is applied and changed and transfer the DCI to the UE, and at least one of a search space group identifier and an activation and deactivation indicator may be included in the DCI. In operation 1*g*-60, the UE performs a plurality of PDCCH monitoring through respective TRPs in the search space changed for reception of the PDCCH repetitive transmission according to the changed indication, and receives and decodes the same.

Figure 8:
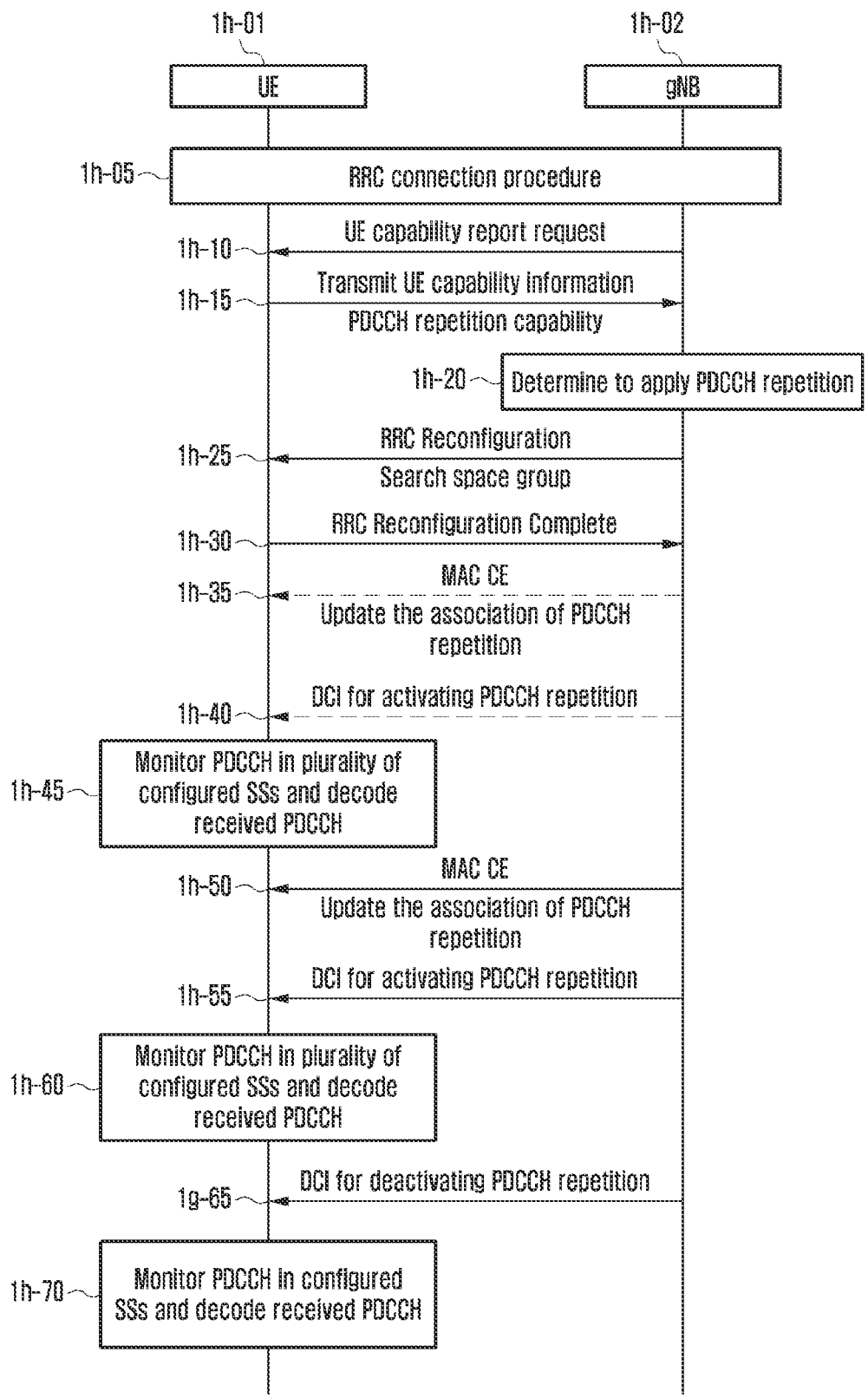
FIG. 8 illustrates an example 2 applied to the procedure of configuring PDCCH repetitive transmission using a plurality of TRPs in the NR system and introducing the MAC CE to update the PDCCH repetitive transmission according to various embodiments of the present disclosure.

FIG. 8 illustrates an example 2 applied to the procedure of configuring PDCCH repetitive transmission using a plurality of TRPs in the NR system and introducing a medium access control (MAC) control element (CE) to update PDCCH repetitive transmission according to various embodiments of the present disclosure. FIG. 8 is additional function description of FIG. 6 and is described on the basis of FIG. 6.

A UE 1*h*-01 camps on a specific gNB 1*h*-02 and makes a connection configuration with a corresponding serving cell in operation 1*h*-05. The gNB makes a request for UE capability information to the UE in operation 1*h*-10, and the UE receives its own UE capability according to the request from the gNB and transfers the same through a UECapabilityInformation message in operation 1*h*-15. The message may include information indicating whether the UE supports capability of receiving the PDCCH repetitive transmission. This may be capability for all UEs or may be separated and reported for each specific band or band combination.

When the gNB identifies the capability of receiving the PDCCH repetitive transmission received from the UE and, when the UE supports the same, determines the PDCCH repetitive transmission in operation 1*h*-20. In operation 1*h*-25, the gNB transfers an RRC reconfiguration message including whether the PDCCH repetitive transmission is performed to the UE, and the corresponding message includes at least one of the search space group and the PDCCH repetitive transmission indicator. The search space group may include information on a group identifier and an identifier of a search space belonging to the corresponding group for each group.

The UE receives the RRC reconfiguration and transfers an RRC reconfiguration completion message indicating that the RRC reconfiguration is received well to the gNB in operation 1h-30.

In the following operations, this embodiment has difference from FIG. 7 (example 1). In operation 1h-35, the gNB may indicate an update of the search space group for the PDCCH repetitive transmission through the MAC CE (method 1) or re-designate and down-select valid M search space groups (N>=M) among N search space groups configured by RRC (method 2). The detailed MAC CE structure and operation are described with reference to FIGS. 10A to 10C.

Thereafter, in operation 1h-40, the gNB may transfer DCI indicating that the PDCCH repetitive transmission is activated to the UE, and the message may include information on which search space group is activated. For example, this may be indicated through at least one of a bit mapped to a search space group ID and an activation/deactivation indicator. Alternatively, activation/deactivation may be indicated when the search space group is configured in an RRC configuration operation, and an initial operation may be used or activation may be determined when the RRC configuration is performed. In this case, restriction of configuring only one search space group in the initial configuration may be needed.

The UE becoming aware of activation of the PDCCH repetitive transmission monitors search spaces within the configured search space group and blind-decodes a downlink control signal in operation 1h-45. That is, the UE may receive the same downlink control signal transmitted in each search space through two TRPs, and perform soft-combining to decode the downlink control signal.

Thereafter, in operation 1h-50, the gNB may transfer the MAC CE again to the UE to indicate the update of the search space group for the PDCCH repetitive transmission. In operation 1h-55, the gNB may indicate, to the UE, which search space group is activated by the PDCCH repetitive transmission among the updated search space groups through the DCI. In this case, the UE may receive the same downlink control signal transmitted in each search space through two TRPs, and perform soft-combining to decode the downlink control signal in operation 1h-60.

Further, in operation 1h-65, an indicator indicating the stop of PDCCH repetitive transmission for the corresponding search space group may be inserted into DCI and at least one of a search space group identifier and an activation and deactivation indicator may be included in the DCI. The UE receiving deactivation of the PDCCH repetitive transmission performs PDCCH monitoring in one search space and receives and decodes the downlink control signal in operation 1h-70. When deactivation is indicated, the UE may naturally return to the operation original TRP 1. Alternatively, when deactivation is indicated through DCI, deactivated or activated specific TRP may also be indicated.

Figure 9:
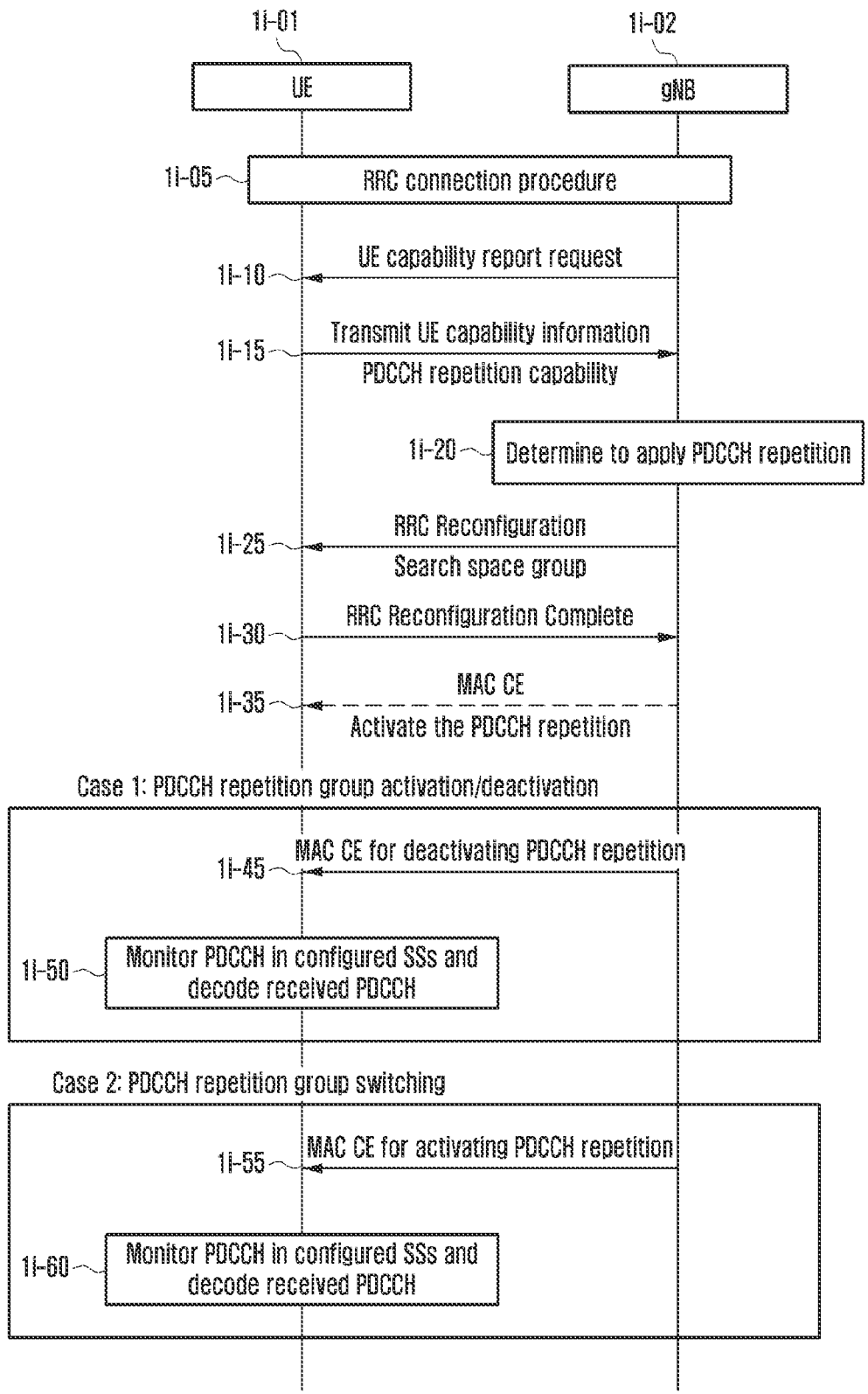
FIG. 9 illustrates an example 3 applied to the procedure of configuring PDCCH repetitive transmission using a plurality of TRPs in the NR system and introducing the MAC CE to activate the PDCCH repetitive transmission.

FIG. 9 illustrates an example 3 applied to the procedure of configuring PDCCH repetitive transmission using a plurality of TRPs in the NR system and introducing the MAC CE to activate the PDCCH repetitive transmission according to various embodiments of the present disclosure. FIG. 8 is additional function description of FIG. 6 and is described on the basis of FIG. 6.

A UE 1i-01 camps on a specific gNB 1i-02 and makes a connection configuration with a corresponding serving cell in operation 1i-05. The gNB makes a request for UE capability information to the UE in operation 1i-10, and the UE receives its own UE capability according to the request from the gNB and transfers the same through a UECapabilityInformation message in operation 1i-15. The message may include information indicating whether the UE supports capability of receiving the PDCCH repetitive transmission. This may be capability for all UEs or may be separated and reported for each specific band or band combination.

When the gNB identifies the capability of receiving the PDCCH repetitive transmission received from the UE and, when the UE supports the same, determines the PDCCH repetitive transmission in operation 1i-20. In operation 1i-25, the gNB transfers an RRC reconfiguration message including whether the PDCCH repetitive transmission is performed to the UE, and the corresponding message includes at least one of the search space group and the PDCCH repetitive transmission indicator. The search space group may include information on a group identifier and an identifier of a search space belonging to the corresponding group for each group.

The UE receives the RRC reconfiguration and transfers an RRC reconfiguration completion message indicating that the RRC reconfiguration is received well to the gNB in operation 1i-30. Thereafter, in operation 1i-35, the gNB may transfer the MAC CE indicating that the PDCCH repetitive transmission is activated to the UE, and the message may include information on which search space group is activated. The detailed MAC CE structure and operation are described with reference to FIGS. 10A to 10C. Alternatively, activation/deactivation may be indicated when the search space group is configured in an RRC configuration operation, and an initial operation may be used or activation may be determined when the RRC configuration is performed. In this case, restriction of configuring only one search space group in the initial configuration may be needed. Although not illustrated in the drawings, after receiving the MAC CE from the gNB, the UE may transfer a confirmation MAC CE in response to the corresponding MAC CE. That is, the UE transfers information on whether the configuration of the gNB is effectively applied well.

The UE becoming aware of activation of the PDCCH repetitive transmission monitors search spaces within the configured search space group and blind-decodes a downlink control signal in operation 1i-40. That is, the UE may receive the same downlink control signal transmitted in each search space through two TRPs, and perform soft-combining to decode the downlink control signal.

The following operations are separately described in two cases.

In one example, the gNB switches PDCCH repetitive transmission activated in the UE to a deactivated state. In this case, in operation 1i-45, the gNB may insert an indicator indicating the stop of PDCCH repetitive transmission for the corresponding search space group into the MAC CE and transfer the MAC CE to the UE, and at least one of a search space group identifier and an activation and deactivation indicator may be included in the MAC CE. The detailed MAC CE structure and operation are described with reference to FIGS. 10A to 10C. Although not illustrated in the drawings, after receiving the MAC CE from the gNB, the UE may transfer a confirmation MAC CE in response to the corresponding MAC CE. That is, the UE transfers information on whether the configuration of the gNB is effectively applied well.

The UE receiving deactivation of the PDCCH repetitive transmission performs PDCCH monitoring in one search space and receives and decodes the downlink control signal in operation 1*i*-50. When deactivation is indicated, the UE may naturally return to the operation original TRP 1. Alternatively, a deactivated or activated specific TRP may also be indicated when deactivation is indicated through the MAC CE.

In another example, the gNB switches PDCCH repetitive transmission activated in the UE to another search space group. In this case, in operation 1*i*-55, the gNB may insert an indicator of a search space group to which the PDCCH repetitive transmission is applied and changed and transfer the MAC CE to the UE, and at least one of a search space group identifier and an activation and deactivation indicator may be included in the MAC CE. The detailed MAC CE structure and operation are described with reference to FIGS. 10A to 10C. Although not illustrated in the drawings, after receiving the MAC CE from the gNB, the UE may transfer a confirmation MAC CE in response to the corresponding MAC CE. That is, the UE transfers information on whether the configuration of the gNB is effectively applied well.

In operation 1*i*-60, the UE performs a plurality of PDCCH monitoring through respective TRPs in the search space changed for reception of the PDCCH repetitive transmission according to the changed indication, and receives and decodes the same.

In addition, when the MAC CE is received and the search space group is activated, a condition indicating that the corresponding operation is performed after X ms from the reception of the MAC CE may be included. This is needed to define accurate timing of the activation operation as a time point after the reception of the MAC CE.

Figure 10A:
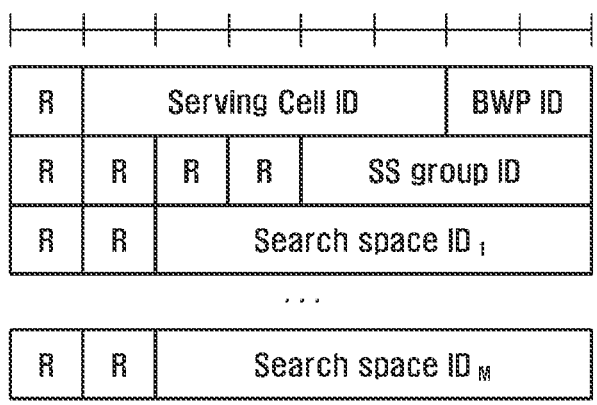
FIG. 10A illustrates an MAC CE format applied to example 2 and example 3 according to various embodiments of the present disclosure.

FIGS. 10A, 10B, and 10C illustrate MAC CE formats applied to example 2 and example 3 according to various embodiments of the present disclosure.

In the drawings, as a scheme applied to example 2 and example 3, the two examples have difference from example 1 in that a new MAC CE is introduced. Hereinafter, the structure and the operation of the MAC CE applied to each example is described in detail.

In example 2, the MAC CE is introduced and a three-step PDCCH repetitive transmission indication procedure is used:
 1) RRC configuration: search space group configuration;
 2) MAC CE indication:
  Method 1: changes search space association information belonging to a specific search space group through the MAC CE, and
  Method 2: provides M (N>=M) valid configurations for N search space groups configured by RRC through the MAC CE; and
 3) DCI indication: PDCCH repetitive transmission activation/deactivation through a specific search space group.

In example 3, the MAC CE is introduced and a two-step PDCCH repetitive transmission indication procedure is used:
 1) RRC configuration: search space group configuration; and
 2) MAC CE indication: PDCCH repetitive transmission activation/deactivation through a specific search space group.

In FIG. 10A, option 1-1 1*j*-05 is an MAC CE format applied to method 1 of example 2:
 Serving cell ID: has 5 bits and identifies serving cell identifiers;
 BWP ID: has 2 bits and identifies BWP identifiers;
 Search space(SS) group ID: corresponds to a plurality of search space group IDs configured by RRC and means a search space group to which the MAC CE operation is applied. For example, 4 bits are indicated, but the real length may be variable; and
 Search space ID: is a search space ID belonging to a search space group ID indicated by the MAC CE, and search space IDs indicated at the same time correspond to search spaces to which PDCCH repetitive transmission can be applied. When a maximum of two TRPs are supported, the number of search space IDs which can be indicated may be limited to 2. Thereafter, the number of indicated search spaces is determined according to the number of TRPs.

In FIG. 10B, operation 2-1 1*j*-10 is an MAC CE format applied to method 2 of example 2:
 Serving cell ID: has 5 bits and identifies serving cell identifiers;
 BWP ID: has 2 bits and identifies BWP identifiers; and
 Search space(SS) group ID: is down-selected as M valid current search space group from among N search space groups configured by RRC in the bitmap form.

In FIG. 10B, operation 2-2 1*j*-15 is an MAC CE format applied to method 2 of example 2:
 Serving cell ID: has 5 bits and identifies serving cell identifiers;
 BWP ID: has 2 bits and identifies BWP identifiers; and
 Search space(SS) group ID: is down-selected as M valid current search space group from among N search space groups configured by RRC in the explicit ID form.

In FIG. 10B, operation 2-3 1*j*-20 is an MAC CE format applied to method 2 of example 2:
 Serving cell ID: has 5 bits and identifies serving cell identifiers;
 BWP ID: has 2 bits and identifies BWP identifiers;
 Search space(SS) group ID: is a search space group ID changed from the search space in which the corresponding MAC CE is applied and included;
 L: is an indicator indicating the last octet. This may exist only when two or more search spaces can be indicated, and may not exists when the number of search spaces is 2. Optional; and
 Search space ID: is a search space for monitoring PDCCH repetitive transmission in the indicated search space (SS) group ID. This may be used to change the configured RRC configuration. When a maximum of two TRPs are supported, the number of search space IDs which can be indicated may be limited to two. Thereafter, the number of indicated search spaces is determined according to the number of TRPs.

In FIG. 10B, operation 2-4 1*j*-25 is an MAC CE format applied to method 2 of example 2:
 Serving cell ID: has 5 bits and identifies serving cell identifiers;
 BWP ID: has 2 bits and identifies BWP identifiers;
 Search space(SS) group ID: is a search space group ID changed from the search space in which the corresponding MAC CE is applied and included; and
 Search space ID: is a search space for monitoring PDCCH repetitive transmission indicated in the bitmap form in the indicated search space (SS) group ID. This may be used to change the configured RRC configuration.

When a maximum of two TRPs are supported, the number of search space IDs which can be indicated may be limited to two. Thereafter, the number of indicated search spaces is determined according to the number of TRPs.

In FIG. 10C, option 3-1 1*j*-30 is an MAC CE format applied to embodiment 3:

Serving cell ID: has 5 bits and identifies serving cell identifiers;

BWP ID: has 2 bits and identifies BWP identifiers;

A/D: is a bit indicating activation or deactivation; and

Search space(SS) group ID: is used to indicate a search space group actually activated among N search space groups configured by RRC in the bitmap form. Only one search space group may be indicated.

In FIG. 10C, option 3-2 1*j*-35 is an MAC CE format applied to example 3:

Serving cell ID: has 5 bits and identifies serving cell identifiers;

BWP ID: has 2 bits and identifies BWP identifiers;

A/D: is a bit indicating activation or deactivation; and

Search space(SS) group ID: is down-selected as M valid current search space group from among N search space groups configured by RRC in the explicit ID form.

In FIG. 10C, option 3-3 1*j*-40 is an MAC CE format applied to example 3:

Serving cell ID: has 5 bits and identifies serving cell identifiers;

BWP ID: has 2 bits and identifies BWP identifiers;

A/D: is a bit indicating activation or deactivation;

Search space(SS) group ID: is a search space group ID changed from the search space in which the corresponding MAC CE is applied and included;

L: is an indicator indicating the last octet. This may exist only when two or more search spaces can be indicated, and may not exists when the number of search spaces is 2. Optional; and Search space ID: is a search space for monitoring PDCCH repetitive transmission in the indicated search space (SS) group ID. This may be used to change the configured RRC configuration. When a maximum of two TRPs are supported, the number of search space IDs which can be indicated may be limited to two. Thereafter, the number of indicated search spaces is determined according to the number of TRPs.

In FIG. 10C, option 3-4 1*j*-45 is an MAC CE format applied to embodiment 3:

Serving cell ID: has 5 bits and identifies serving cell identifiers;

BWP ID: has 2 bits and identifies BWP identifiers;

A/D: is a bit indicating activation or deactivation;

Search space(SS) group ID: is a search space group ID changed from the search space in which the corresponding MAC CE is applied and included; and Search space ID: is a search space for monitoring PDCCH repetitive transmission indicated in the bitmap form in the indicated search space (SS) group ID. This may be used to change the configured RRC configuration. When a maximum of two TRPs are supported, the number of search space IDs which can be indicated may be limited to two. Thereafter, the number of indicated search spaces is determined according to the number of TRPs.

In addition, a serving cell ID, a BWP ID, a search space, and a search space group ID used in the drawing may basically have a value configured by RRC, but an identifier range newly defined in the MAC which can be used by the MAC CE may be used.

Figure 11:
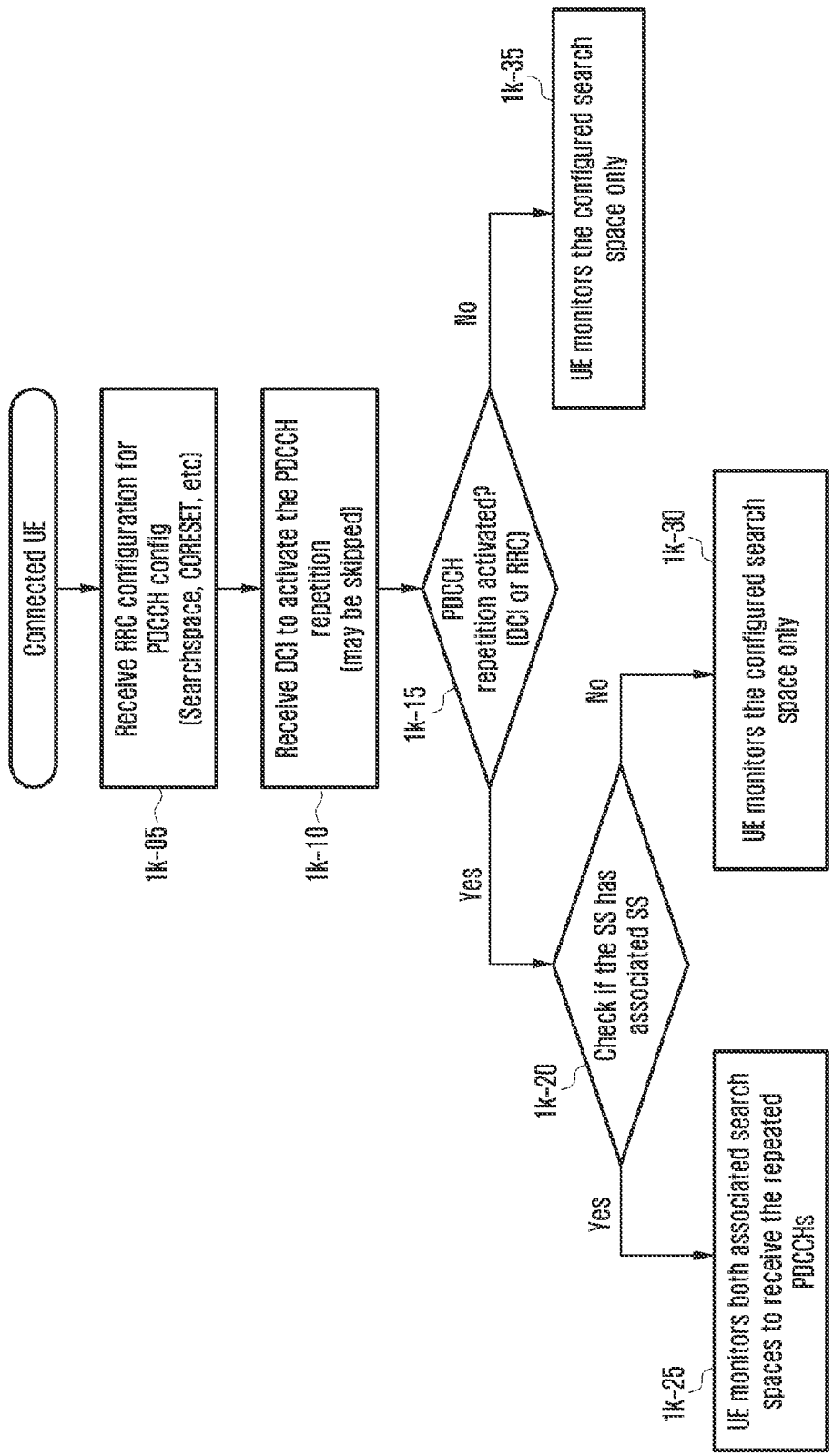
FIG. 11 illustrates a UE operation for example 1 according to various embodiments of the present disclosure.

FIG. 11 illustrates a UE operation for example 1 according to various embodiments of the present disclosure.

The UE in the RRC-connected state receives PDCCH configuration information from the gNB through the RRC reconfiguration message in operation 1*k*-05, and PDCCH configuration information for a plurality of TRPs, particularly, a search space group for reception of PDCCH repetitive transmission and search space configuration information belonging to the corresponding group are provided through the corresponding configuration information. Particularly, a plurality of search space groups may be provided through CORESET and search space configurations for PDCCH-Config of the RRC message, and search spaces included in the corresponding group may be associated with each other and decoded when the PDCCH is received through the plurality of TRPs.

The UE may receive DCI in operation 1*k*-10, and may receive an indication indicating which search space group is initially activated among a plurality of search space groups received by the RRC configuration in the above operation in operation 1*k*-10. When the RRC message indicates the initially activated search space group or indicates one search space group by the RRC configuration, the corresponding operation may be omitted. Thereafter, in operation 1*k*-15, the UE may identify that the PDCCH repetitive transmission is actually indicated according to reception of RRC or DCI, and the operation varies.

When the UE receives activation information of the PDCCH repetitive transmission, the UE identifies associated search spaces within the search space group configured by RRC and indicated to be activated (search space group activated by RRC or DCI) in operation 1*k*-20. When there is a search space associated with the indicated search space group, the UE monitors the PDDCH repetitive transmission through associated search spaces, and then receives and decodes the same in operation 1*k*-25. On the other hand, when there is no search space associated with the indicated search space group, the UE monitors the PDDCH repetitive transmission through one configured search space, and then receives and decodes the same in operation 1*k*-30.

When the UE does not receive activation information for the PDCCH repetitive transmission in operation 1*k*-15, the UE monitors the PDCCH repetitive transmission through one configured search space, and then receives and decodes the same in operation 1*k*-35.

Figure 12:
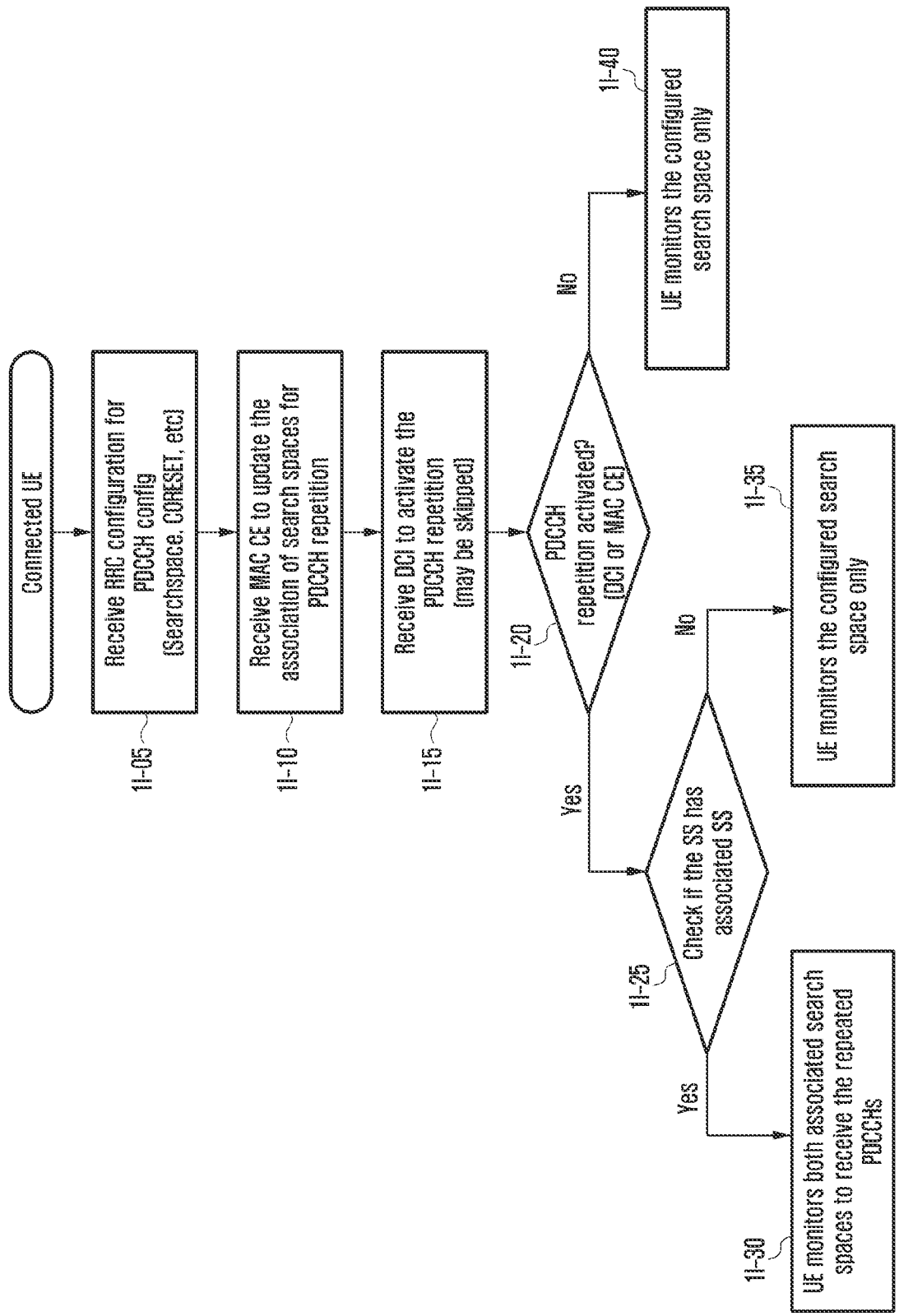
FIG. 12 illustrates a UE operation for example 2 and example 3 according to various embodiments of the present disclosure.

FIG. 12 illustrates a UE operation for example 2 and example 3 according to various embodiments of the present disclosure.

The UE in the RRC-connected state receives PDCCH configuration information from the gNB through the RRC reconfiguration message in operation 1*l*-05, and PDCCH configuration information for a plurality of TRPs, particularly, a search space group for reception of PDCCH repetitive transmission and search space configuration information belonging to the corresponding group are provided through the corresponding configuration information. Particularly, a plurality of search space groups may be provided through CORESET and search space configurations for PDCCH-Config of the RRC message, and search spaces included in the corresponding group may be associated with each other and decoded when the PDCCH is received through the plurality of TRPs. In operation 1*l*-10, the UE may receive the MAC CE from the gNB and perform an update operation for the search space group received by the previous RRC configuration or the search space belonging to the corresponding group or may receive the MAC CE and receive an indication indicating which search space group is activated among a plurality of search space groups received by the RRC configuration (this case is applied only when a method of activating the search space group through DCI is not used).

The UE may receive DCI in operation 1*l*-15, and may indicate which search space group is initially activated among a plurality of search space groups received by the RRC configuration in the above operation. When the RRC message indicates the activated search space group or indicates one search space group by the RRC configuration, the corresponding operation may be omitted. Thereafter, in operation 1*l*-20, the UE may identify that the PDCCH repetitive transmission is actually indicated according to reception of the MAC CE or DCI, and the operation varies.

When the UE receives activation information of the PDCCH repetitive transmission, the UE identifies associated search spaces within the search space group configured by RRC and indicated to be activated (search space group activated by the MAC CE or DCI) in operation 1*l*-25. When there is a search space associated with the indicated search space group, the UE monitors the PDDCH repetitive transmission through associated search spaces, and then receives and decodes the same in operation 1*l*-30. On the other hand, when there is no search space associated with the indicated search space group, the UE monitors the PDDCH repetitive transmission through one configured search space, and then receives and decodes the same in operation 1*l*-35.

When the UE does not receive activation information for the PDCCH repetitive transmission in operation 1*l*-20, the UE monitors the PDCCH repetitive transmission through one configured search space, and then receives and decodes the same in operation 1*l*-40.

Figure 13:
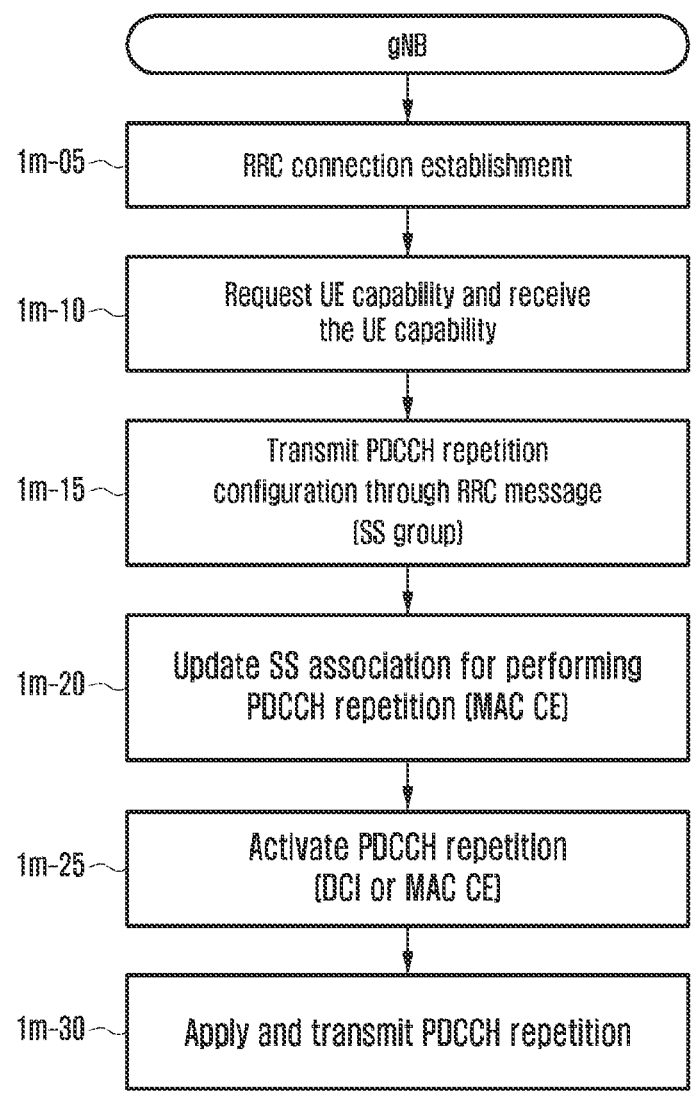
FIG. 13 illustrates the overall operation of the gNB according to various embodiments of the present disclosure.

FIG. 13 illustrates the overall operation of the gNB according to various embodiments of the present disclosure.

The gNB establishes a connection establishment with the UE in operation 1*m*-05 and requests UE capability and receives the requested UE capability in operation 1*m*-10. It may be determined whether there is capability of receiving and decoding PDCCH repetitive transmission for a plurality of TRPs according to the UE capability in the corresponding operation, and then RRC configuration information considering the UE capability may be provided in operation 1*m*-15. In the corresponding operation, the gNB may provide PDCCH repetitive transmission-related configuration information (search space group) through the PDCCH configuration and a plurality of TRPs and information indicating whether the corresponding operation is indicated. The gNB may update search space mapping information which can be applied to the PDCCH transmission for a plurality of TRPs through the MAC CE in operation 1*m*-20, and may indicate the search space group for monitoring the actual PDCCH repetitive transmission through the plurality of TRPs by a specific bit in the DCI or transfer the search space group through the MAC CE. In operation 1*m*-30, the gNB performs PDCCH repetitive transmission on the basis of the configuration provided to the UE. That is, the same PDCCH control message is transmitted through the configured search space.

Figure 14:
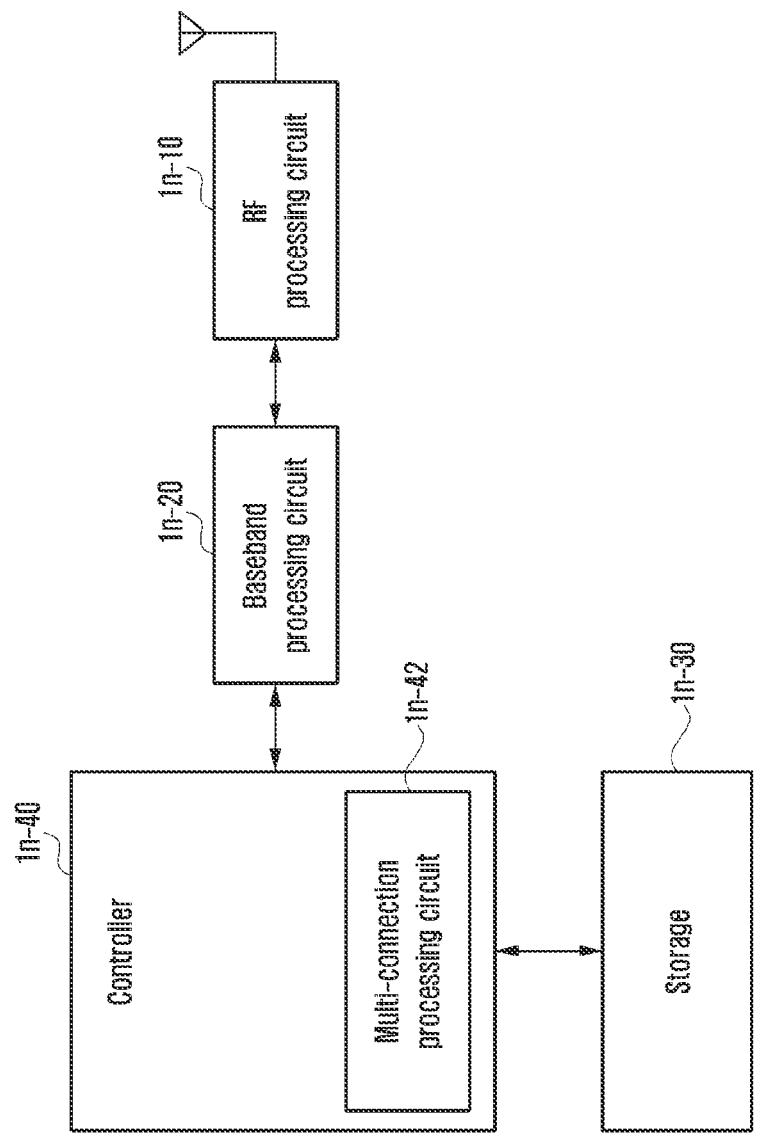
FIG. 14 illustrates a block diagram of internal structure of the UE according to various embodiments of the present disclosure.

FIG. 14 illustrates a block diagram of an internal structure of the UE according to various embodiments of the present disclosure.

Referring to FIG. 14, the UE includes a radio-frequency (RF) processing circuit 1*n*-10, a baseband processing circuit 1*n*-20, a storage 1*n*-30, and a controller 1*n*-40.

The RF processing circuit 1*n*-10 performs a function for transmitting and receiving a signal through a wireless channel, such as band conversion and amplification of a signal. That is, the RF processing circuit 1*n*-10 up-converts a baseband signal provided from the baseband processing circuit 1-20 into an RF band signal, transmits the RF band signal through an antenna, and then down-converts the RF band signal received through the antenna into a baseband signal. For example, the RF processing circuit 1*n*-10 may include a transmission filter, a reception filter, an amplifier, a mixer, an oscillator, a digital-to-analog convertor (DAC), an analog-to-digital convertor (ADC), and the like. Although FIG. 14 illustrates only one antenna, the UE may include a plurality of antennas. The RF processing circuit 1*n*-10 may include a plurality of RF chains. The RF processing circuit 1*n*-10 may perform beamforming. For the beamforming, the RF processing circuit 1*n*-10 may control the phase and size of each signal transmitted/received through a plurality of antennas or antenna elements. The RF processing circuit may perform MIMO and receive a plurality of layers when performing the MIMO operation.

The baseband processing circuit 1*n*-20 performs a function for conversion between a baseband signal and a bitstream according to a physical layer standard of the system. For example, when data is transmitted, the baseband processing circuit 1*n*-20 generates complex symbols by encoding and modulating a transmission bitstream. Further, when data is received, the baseband processing circuit 1*n*-20 reconstructs a reception bitstream by demodulating and decoding a baseband signal provided from the RF processing circuit 1*n*-10. For example, in an orthogonal frequency division multiplexing (OFDM) scheme, when data is transmitted, the baseband processing circuit 1*n*-20 generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, when data is received, the baseband processing circuit 1*n*-20 divides the baseband signal provided from the RF processing circuit 1*n*-10 in units of OFDM symbols, reconstructs the signals mapped to the subcarriers through a fast Fourier transform (FFT) operation, and then reconstructs a reception bitstream through demodulation and decoding.

The baseband processing circuit 1*n*-20 and the RF processing circuit 1*n*-10 transmits and receives the signal as described above. Accordingly, the baseband processing circuit 1*n*-20 and the RF processing circuit 1*n*-10 may be referred to as a transmitter, a receiver, a transceiver, or a communication circuit. At least one of the baseband processing circuit 1*n*-20 and the RF processing circuit 1*n*-10 may include a plurality of communication modules in order to support a plurality of different radio access technologies. Further, at least one of the baseband processing circuit 1*n*-20 and the RF processing circuit 1*n*-10 may include different communication modules in order to process signals in different frequency bands. For example, the different radio access technologies may include a wireless LAN (for example, IEEE 802.11) and a cellular network (for example, LTE). Further, the different frequency bands may include a super high frequency (SHF) (for example, 2 NRHz, NRhz) band and a millimeter (mm) wave (for example, 60 GHz) band.

The storage 1*n*-30 stores a basic program for the operation of the UE, an application program, and data such as configuration information. Particularly, the storage 1*n*-30 may store information related to a second access node for performing wireless communication through a second radio access technology. The storage 1n-30 provides stored data according to a request from the controller 1n-40.

The controller 1n-40 controls the overall operation of the UE. For example, the controller 1n-40 transmits and receives a signal through the baseband processing circuit 1n-20 and the RF processing circuit 1n-10. The controller 1n-40 records data in the storage 1n-30 and reads the data. To this end, the controller 1n-40 may include at least one processor. For example, the controller 1n-40 may include a communications processor (CP) that performs control for communication, and an application processor (AP) that controls higher layers such as an application program.

Figure 15:
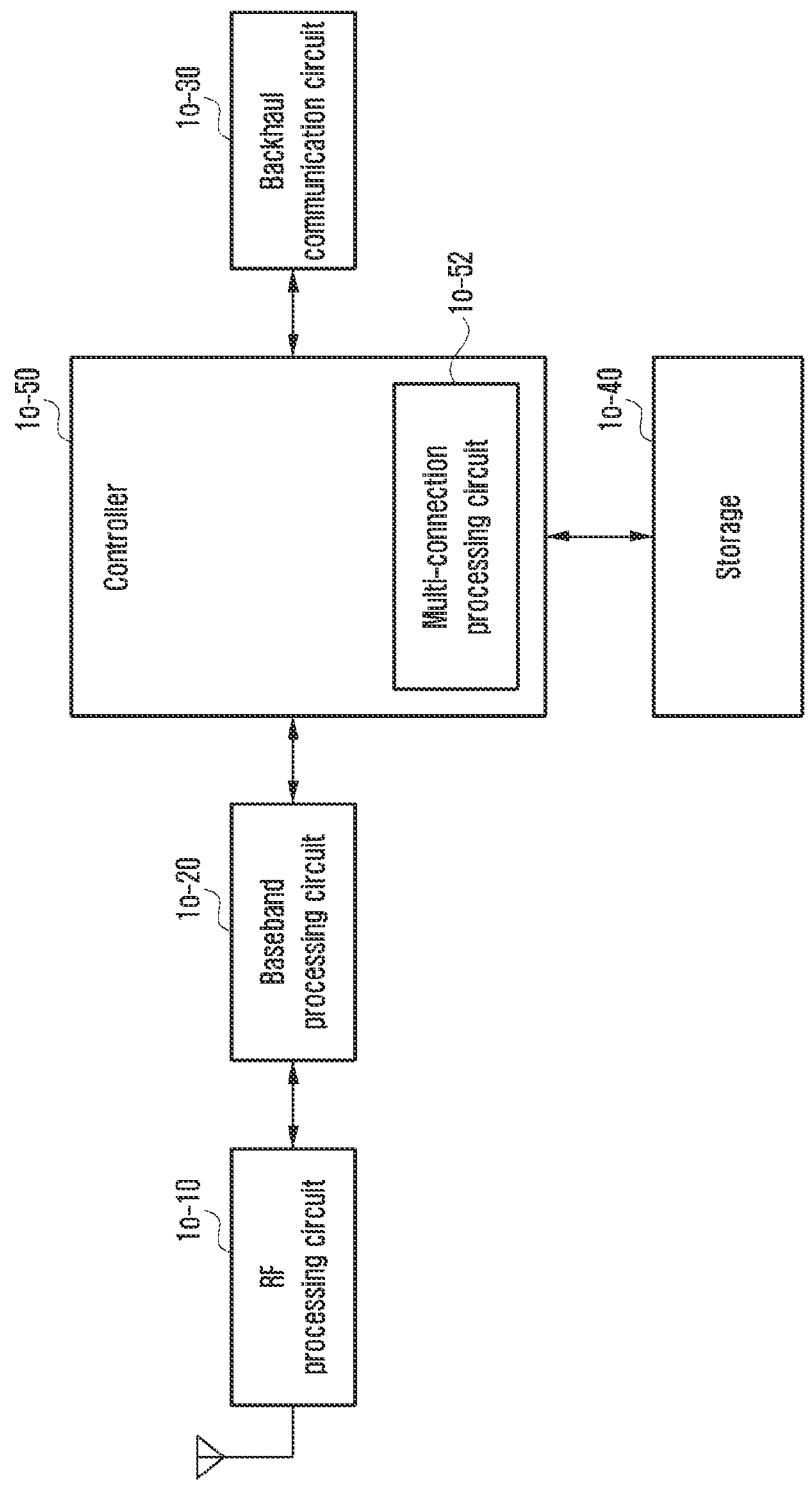
FIG. 15 illustrates a block diagram of the configuration of the NR gNB according to various embodiments of the present disclosure.

FIG. 15 illustrates a block diagram of the configuration of the NR gNB according to various embodiments of the present disclosure.

As illustrated in FIG. 15, the gNB includes an RF processing circuit 1o-10, a baseband processing circuit 1o-20, a backhaul communication circuit 1o-30, a storage 1o-40, and a controller 1o-50.

The RF processing circuit 1o-10 performs a function for transmitting and receiving a signal through a wireless channel, such as band conversion and amplification of a signal. That is, the RF processing circuit 1o-10 up-converts a baseband signal provided from the baseband processing circuit 1o-20 into an RF band signal, transmits the RF band signal through an antenna, and then down-converts the RF band signal received through the antenna into a baseband signal. For example, the RF processing circuit 1o-10 may include a transmission filter, a reception filter, an amplifier, a mixer, an oscillator, a DAC, and an ADC. Although FIG. 15 illustrates only one antenna, the first access node may include a plurality of antennas. Further, the RF processing circuit 1o-10 may include a plurality of RF chains. The RF processing circuit 1o-10 may perform beamforming. For the beamforming, the RF processing circuit 1o-10 may control the phase and the size of each of the signals transmitted and received through a plurality of antennas or antenna elements. The RF processing circuit may perform a downlink MIMO operation by transmitting one or more layers.

The baseband processing circuit 1o-20 performs a function of performing conversion between a baseband signal and a bitstream according to a physical-layer standard of the first radio-access technology. For example, when transmitting data, the baseband processing circuit 1o-20 generates complex symbols by encoding and modulating a transmission bitstream. Further, in data reception, the baseband processing circuit 1o-20 reconstructs a reception bitstream by demodulating and decoding a baseband signal provided from the RF processing circuit 1o-10. For example, in an OFDM scheme, when data is transmitted, the baseband processing circuit 1o-20 may generate complex symbols by encoding and modulating the transmission bitstream, map the complex symbols to subcarriers, and then configure OFDM symbols through an IFFT operation and CP insertion.

In addition, when data is received, the baseband processing circuit 1o-20 divides a baseband signal provided from the RF processing circuit 1o-10 in units of OFDM symbols, recovers signals mapped with subcarriers through an FFT operation, and then recovers a reception bitstream through demodulation and decoding. The baseband processing circuit 1o-20 and the RF processing circuit 1o-10 may transmit and receive signals as described above. Accordingly, the baseband processing circuit 1o-20 and the RF processing circuit 1o-10 may be referred to as a transmitter, a receiver, a transceiver, a communication circuit, or a wireless communication circuit.

The backhaul communication circuit 1o-30 provides an interface for communicating with other nodes within the network. That is, the backhaul communication circuit 10-30 converts a bitstream transmitted to another node, for example, the SeNB or a core network from the MeNB, into a physical signal and converts a physical signal received from the other node into the bitstream.

The storage 1o-40 stores a basic program for the operation of the MeNB, an application program, and data such as configuration information. Particularly, the storage 1o-40 may store information on bearers allocated to the accessed UE and the measurement result reported from the accessed UE. Further, the storage 1o-40 may store information that is the reference for determining whether to provide or stop multiple connections to the UE. In addition, the storage 1o-40 provides the stored data according to a request from the controller 1o-50.

The controller 1o-50 controls the overall operation of the MeNB. For example, the controller 1o-50 transmits and receives a signal through the baseband processing circuit 1o-20 and the RF processing circuit 1o-10 or the backhaul communication circuit 1o-30. Further, the controller 1o-50 records data in the storage 1o-40 and reads the data. To this end, the controller 1o-50 may include at least one processor.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof

What is claimed is:

1. A method performed by a base station in a wireless communication system, the method comprising:
   transmitting, to a terminal through a radio resource control (RRC) signaling, first configuration information including information on at least two search spaces and information on a group identity (ID) used to link the at least two search spaces for physical downlink control channel (PDCCH) repetition;
   transmitting, to the terminal, a PDCCH in the at least two search spaces, based on the first configuration information; and
   transmitting, to the terminal, second configuration information for updating the first configuration information including the information on the group ID and information on an ID of a search space reconfigured to the group ID for the PDCCH repetition.

2. The method of claim 1, wherein the first configuration information includes a plurality of group IDs and a plurality of configurations indicating search spaces associated with the plurality of group IDs, and wherein the second configuration information is transmitted through a medium access control (MAC) control element (CE) including bit information indicating at least one configuration applied to the terminal among the plurality of configurations.

3. The method of claim 2, further comprising: transmitting, to the terminal, downlink control information (DCI) for activating one of the at least one configuration based on the MAC CE.

4. The method of claim 1, wherein the second configuration information is transmitted through a medium access control (MAC) control element (CE).

5. The method of claim 4, further comprising:
receiving, from the terminal, a confirmation MAC CE as a response to the MAC CE;
wherein the PDCCH is transmitted based on the confirmation MAC CE.

6. A method performed by a terminal in a wireless communication system, the method comprising:
receiving, from a base station through a radio resource control (RRC) signaling, first configuration information including information on at least two search spaces and information on a group identity (ID) used to link the at least two search spaces for physical downlink control channel (PDCCH) repetition;
monitoring a PDCCH in the at least two search spaces, based on the first configuration information; and
receiving, from the base station, second configuration information for updating the first configuration information including the information on the group ID and information on an ID of a search space reconfigured to the group ID for the PDCCH repetition.

7. The method of claim 6, wherein the first configuration information includes a plurality of group IDs and a plurality of configurations indicating search spaces associated with the plurality of group IDs, and wherein the second configuration information is transmitted through a medium access control (MAC) control element (CE) including bit information indicating at least one configuration applied to the terminal among the plurality of configurations.

8. The method of claim 7, further comprising: receiving, from the base station, downlink control information (DCI) for activating one of the at least one configuration based on the MAC CE.

9. The method of claim 6, wherein the second configuration information is transmitted through a medium access control (MAC) control element (CE).

10. The method of claim 9, further comprising:
transmitting, to the base station, a confirmation MAC CE as a response to the MAC CE,
wherein the PDCCH is monitored in the at least two search spaces based on the confirmation MAC CE.

11. A base station in a wireless communication system, the base station comprising:
a transceiver; and
a controller configured to:
control the transceiver to transmit, to a terminal through a radio resource control (RRC) signaling, first configuration information including information on at least two search spaces and information on a group identity (ID) used to link the at least two search spaces for physical downlink control channel (PDCCH) repetition,
control the transceiver to transmit, to the terminal, a PDCCH in the at least two search spaces, based on the first configuration information, and
control the transceiver to transmit, to the terminal, second configuration information for updating the first configuration information including the information on the group ID and information on an ID of a search space reconfigured to the group ID for the PDCCH repetition.

12. The base station of claim 11, wherein the first configuration information includes a plurality of group IDs and a plurality of configurations indicating search spaces associated with the plurality of group IDs, and wherein the second configuration information is transmitted through a medium access control (MAC) control element (CE) including bit information indicating at least one configuration applied to the terminal among the plurality of configurations.

13. The base station of claim 12, wherein the controller is further configured to control the transceiver to transmit, to the terminal, downlink control information (DCI) for activating one of the at least one configuration based on the MAC CE.

14. The base station of claim 11, wherein the second configuration information is transmitted through a medium access control (MAC) control element (CE).

15. The base station of claim 14, wherein the controller is further configured to control the transceiver to receive, from the terminal, a confirmation MAC CE as a response to the MAC CE, and
wherein the PDCCH is transmitted based on the confirmation MAC CE.

16. A terminal in a wireless communication system, the terminal comprising:
a transceiver; and
a controller configured to:
control the transceiver to receive, from a base station through a radio resource control (RRC) signaling, first configuration information including information on at least two search spaces and information on a group identity (ID) used to link the at least two search spaces for physical downlink control channel (PDCCH) repetition,
monitor a PDCCH in the at least two search spaces, based on the first configuration information, and
control the transceiver to receive, from the base station, second configuration information for updating the first configuration information including the information on the group ID and information on an ID of a search space reconfigured to the group ID for the PDCCH repetition.

17. The terminal of claim 16, wherein the first configuration information includes a plurality of group IDs and a plurality of configurations indicating search spaces associated with the plurality of group IDs, and wherein the second configuration information is transmitted through a medium access control (MAC) control element (CE) including bit information indicating at least one configuration applied to the terminal among the plurality of configurations.

18. The terminal of claim 17, wherein the controller is further configured to control the transceiver to receive, from the base station, downlink control information (DCI) for activating one of the at least one configuration based on the MAC CE.

19. The terminal of claim 16, wherein the second configuration information is transmitted through a medium access control (MAC) control element (CE).

20. The terminal of claim 19, wherein the controller is further configured to control transceiver to transmit, to the base station, a confirmation MAC CE as a response to the MAC CE, and
wherein the PDCCH is monitored in the at least two search spaces based on the confirmation MAC CE.

* * * * *